US006963726B2

(12) United States Patent
Nakagawa et al.

(10) Patent No.: US 6,963,726 B2
(45) Date of Patent: Nov. 8, 2005

(54) SATELLITE BROADCASTING RECEIVING CONVERTER FOR RECEIVING RADIO WAVES FROM PLURALITY OF SATELLITES

(75) Inventors: Masashi Nakagawa, Fukushima-ken (JP); Kazutoyo Kajita, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 474 days.

(21) Appl. No.: 10/251,201

(22) Filed: Sep. 20, 2002

(65) Prior Publication Data

US 2003/0068980 A1 Apr. 10, 2003

(30) Foreign Application Priority Data

Sep. 21, 2001 (JP) ....................................... 2001-289721
Sep. 21, 2001 (JP) ....................................... 2001-289777

(51) Int. Cl.[7] ................................................ H04B 7/185
(52) U.S. Cl. ..................... 455/13.3; 455/427; 455/12.1; 455/118; 343/840
(58) Field of Search ............................... 455/13.3, 12.1, 455/427, 431, 81, 272, 4.27, 3, 118; 343/840, 756; 333/26

(56) References Cited

U.S. PATENT DOCUMENTS

| | | | | | |
|---|---|---|---|---|---|
| 4,663,634 | A | * | 5/1987 | Fulton | 343/756 |
| 5,959,592 | A | * | 9/1999 | Petruzzelli | 725/68 |
| 6,018,276 | A | * | 1/2000 | Hirota et al. | 333/26 |
| 6,075,497 | A | | 6/2000 | Chen et al. | |
| 6,075,970 | A | * | 6/2000 | Van Amesfoort | 455/3.02 |
| 6,111,547 | A | | 8/2000 | Gau et al. | |
| 6,225,865 | B1 | * | 5/2001 | Muterspaugh | 330/51 |
| 2003/0190902 | A1 | * | 10/2003 | Horie et al. | 455/272 |

FOREIGN PATENT DOCUMENTS

| | | |
|---|---|---|
| EP | 0 843 381 | 5/1998 |
| EP | 1 024 613 | 8/2000 |
| EP | 1 050 920 | 11/2000 |
| EP | 1 089 469 | 4/2001 |
| FR | 2 716 049 | 8/1995 |
| GB | 814 355 | 6/1959 |
| JP | 56 141603 | 11/1981 |
| JP | HEI 10-190505 | 7/1998 |
| JP | 2000-252849 | 9/2000 |

OTHER PUBLICATIONS

"A Dual–Channel Ku–Band DBS Downconverter;" P.Bacon et al.; Gallium Arsenide Integrated Circuit (GAASIC) Symposium, 1993; Technical Digest 1993, pp. 233–236.
Ephan, N. et al.; "Mehrere Satelliten Auf Einen Streich", Funkschau, Franzis–Verlag K.G. Munchen, DE vl. 62, No. 17, Aug. 10, 1990, pp. 54–57, XP000147783.

* cited by examiner

*Primary Examiner*—Nick Corsaro
*Assistant Examiner*—Tan Trinh
(74) *Attorney, Agent, or Firm*—Brinks Hofer Gilson & Lione

(57) ABSTRACT

First and second waveguides which have respective axes thereof arranged parallel to each other are respectively held by dielectric feeders. A projection wall or a thick wall is formed as a correction part on a front surface of a waterproof cover which covers radiation parts of the dielectric feeders. Due to such a constitution, when radio waves transmitted from neighboring first and second satellites are converged by a reflector and are incident on the inside of respective waveguides, it is possible to delay a phase of radio waves which pass the waterproof cover by the correction part (projection wall or thick wall) so that it is possible to adjust such that radiation patterns of radio waves which are incident on the respective waveguides are reflected on a common portion of the reflector whereby the required reflector can be miniaturized.

4 Claims, 15 Drawing Sheets

SATELLITE BROADCASTING RECEIVING CONVERTER FOR RECEIVING RADIO WAVES FROM PLURALITY OF SATELLITES

BACKGROUND OF THE INVENTION

1. Field of the Invention

The present invention relates to a satellite broadcasting receiving converter which can receive radio waves transmitted from a plurality of neighboring satellites.

2. Description of the Related Art

In receiving radio waves from a plurality of neighboring satellites, that is, when satellite broadcasting signals having leftward circularly polarization and rightward circularly polarization are respectively transmitted from two satellites and these satellite broadcasting signals are inputted to separate feed horns and waveguides and received by one LNB, for example, it is necessary to perform frequency conversion of the leftward circularly polarized signal and the rightward circularly polarized signal which are picked up by the waveguides into intermediate frequency bands which are different from each other. In this case, the leftward circularly polarized signal and the rightward circularly polarized signal transmitted from one satellite are subjected to frequency conversion into the different intermediate frequency bands using two mixers. Here, among four mixers served for two satellites, by connecting a first oscillator to two mixers for leftward circularly polarization and by connecting the second oscillator to two mixers for rightward circularly polarization, it is possible to perform frequency conversion of the left ward circularly polarized signal and the rightward circularly polarized signal respectively transmitted from two satellites into the intermediate frequency bands using the first oscillator and the second oscillator which differ in oscillation frequency.

To design a layout of such a converter circuit on a printed circuit board, it is inevitably necessary to make portions of oscillation signal lines which connect between the first and second oscillators and respective mixers cross intermediate frequency signal lines for intermediate frequency signals outputted from respective mixers. For example, assume a case in which the converter circuit is designed such that the first and second oscillators are sandwiched by the leftward and rightward circularly polarized signal lines of two satellites, respective leftward circularly polarized signal lines are arranged at the inside, and respective rightward circularly polarized signal lines are arranged at the outside. In this case, to connect the second oscillator to two mixers for rightward circularly polarization positioned at the outside, it is necessary to make the oscillation signal lines cross respective intermediate frequency signal lines. Accordingly, conventionally, the converter is mounted on a front surface of the printed circuit board which has a ground pattern on a back surface thereof, and at portions where the oscillation signal lines cross the intermediate frequency signal lines, both ends of each coaxial cable mounted on the back surface of the printed circuit board are made to penetrate the printed circuit board and are soldered to the oscillation signal lines so that the oscillation signal lines are made to cross the intermediate frequency signal lines by way of the coaxial cables mounted on the back surface side of the printed circuit board.

Further, with respect to the satellite broadcasting receiving converter for receiving radio waves transmitted from a plurality of neighboring satellites, for example, when a degree of elongation between two satellites launched to the sky is small and the radio waves transmitted from these two satellites are received by one outdoor antenna device installed on the ground, it is necessary to mount two waveguides on the outdoor antenna device such that the waveguides face a reflector.

Conventionally, as an example of such a two-satellite broadcasting receiving converter, there has been known a converter which uses two waveguides having the same structure for one satellite and mounts these waveguides such that the waveguides are arranged in parallel and face a reflector in an opposed manner. In this case, opening end faces of two waveguides which are arranged in parallel are positioned on the same plane so that radio waves which are transmitted from two satellites having a given degree of elongation are respectively incident on the inside of the converter from the opening ends of two waveguides after being reflected by the reflector.

Further, as another conventional example of such a two-satellite broadcasting receiving converter, there has been known a converter in which two waveguides are integrally formed by diecasting using alloy of aluminum, zinc or the like and these waveguides are arranged to face a reflector in a state that the waveguides or openings of the waveguides are inclined. In this case, respective opening end faces of two waveguides are positioned within different planes having a V shape so that radio waves transmitted from two satellites having a given degree of elongation are incident on the inside of the converter in the direction perpendicular to opening end faces of the two waveguides after being reflected on the reflector.

As mentioned previously, according to a related art in which when the broadcasting signals transmitted from a plurality of satellites are received by one LNB, the oscillation signal lines and the intermediate frequency signal lines are made to cross each other using the coaxial cables, since respective signal lines are grounded, the interference between signals having different frequencies can be reduced. However, it is necessary to provide the coaxial cables in addition to the printed circuit board and the coaxial cables must be soldered to the signal lines after projecting the coaxial cables from the back surface to the front surface of the printed circuit board and hence, the step for connecting the coaxial cables is time-consuming and cumbersome and it gives rise to a problem that the manufacturing cost is pushed up.

Further, with respect to the above-mentioned related arts, in the former type which arranges two waveguides in parallel, the waveguide for one satellite can be directly utilized as waveguides for two satellites and hence, it is possible to have an advantageous effect that the elevation of the manufacturing cost can be suppressed due to the common use of parts. However, since the opening end faces of two waveguides which are arranged in parallel are positioned within the same plane, when the radio waves transmitted from two satellites having given degree of elongation enter respective waveguides after being reflected on a common reflector, portions of the reflector which reflect only the radio waves transmitted from one satellite are increased thus giving rise to a problem that it is inevitably necessary to use a large-sized reflector.

To the contrary, in the latter type in which two waveguides are inclined, since a preset angle which is preliminarily set to a desired angle is provided to the opening end faces of two waveguides, the radio waves transmitted from two satellites enter respective waveguides after being reflected on a common portion of the reflector and hence, it is possible to use a small-sized or miniaturized reflector correspondingly. However, since a mold for diecasting which has a complicated structure and is expensive is necessary for integrally forming two waveguides and hence, there arises a problem that the manufacturing cost of the satellite broadcasting receiving converter is pushed up. Further, it is necessary to change the inclination angles of two waveguides corresponding to the degree of elongation of the satellites which are subjected to signal reception so that there has been a problem that the latter type cannot provide versatility.

SUMMARY OF THE INVENTION

The present invention has been made in view of such circumstances of the related art and it is an object of the present invention to provide a satellite broadcasting receiving converter which can reduce the manufacturing cost and, at the same time, can provide versatility.

To achieve the above-mentioned object, according to the present invention, in a satellite broadcasting receiving converter which receives radio signals transmitted from a plurality of neighboring satellites, performs frequency conversion of two polarized signals transmitted from one satellite into different intermediate frequency bands using first and second mixers, and connects each first mixer and each second mixer to either one of two local oscillation circuits which differ in oscillation frequency from each other, the local oscillation circuit and each of the mixers are connected to each other using an oscillation signal line on one surface of a first printed circuit board, another surface of the first printed circuit board and one surface of a second printed circuit board are bonded by way of a ground pattern, an intermediate frequency signal line for an intermediate frequency signal outputted from each of the mixers is pulled out from one surface of the first printed circuit board to another surface of the second printed circuit board at bonded portions, and the intermediate frequency signal line and the oscillation signal line are made to cross each other.

Due to such a constitution, by overlapping the first printed circuit board and the second printed circuit board, the oscillation signal line and the intermediate frequency signal line can be made to cross each other while holding the grounding and hence, a coaxial cable which necessitates time-consuming and cumbersome operation in connection can be eliminated so that the manufacturing cost of the satellite broadcasting receiving converter can be reduced.

In the above-mentioned constitution, although it may be sufficient that the ground pattern is formed on at least either one of the first printed circuit board and the second printed circuit board at bonded portions, it is preferable to form the ground patterns on both of the first and second printed circuit boards so as to ensure the grounding with respect to respective signal lines.

Further, in the above-mentioned constitution, although the intermediate frequency signal line may be pulled out from one surface of the first printed circuit board to another surface of the second printed circuit board via a through hole or the like, it is preferable to use a connecting pin as such pull-out means.

Further, in the above-mentioned constitution, although the first printed circuit board and the second printed circuit board may be formed of the same material, it is preferable that the second printed circuit board is formed of a material which has a Q value lower than that of a material of the first printed circuit board in view of achieving the reduction of a total cost of the printed circuit boards.

Further, the present invention is also characterized in that the satellite broadcasting receiving converter includes a plurality of waveguides which are mounted in an opposed manner on a reflector which reflects radio waves transmitted from a plurality of neighboring satellites and have respective axes thereof arranged parallel to each other, and a waterproof cover formed of a dielectric which is arranged so as to cover respective openings of the waveguides, wherein a correction part which delays a phase of radio waves incident on the respective waveguides is formed on the waterproof cover.

Due to such a constitution, when the radio waves transmitted from a plurality of neighboring satellites enter the openings of respective waveguides after being reflected on the reflector, since the phase of the radio waves which pass the waterproof cover are delayed by a correction part, it is possible to make adjustments such that radiation patterns of radio waves which are incident on the respective waveguides are reflected on a common portion of the reflector so that the required reflector can be miniaturized. Further, since the waveguides having the same structure as waveguides for one satellite are used, the manufacturing cost can be reduced. Still further, it is sufficient to change the waterproof cover in response to the degree of elongation of the satellites which are subjected to reception and hence, the satellite broadcasting receiving converter which can provide versatility can be realized.

In the above-mentioned constitution, it is preferable to provide the correction part mounted on the waterproof cover at positions which traverses a space between respective waveguides. For example, in receiving radio waves transmitted from two neighboring satellites, the correction part mounted on the waterproof cover may be arranged to face respective openings of two waveguides.

Further, in the above-mentioned constitution, as specific constitutions of the correction part, it is possible to adopt a thick wall which partially increases the thickness of the waterproof cover or adopt a wall projected from a back surface of the waterproof cover.

DESCRIPTION OF PREFERRED EMBODIMENT

Figure 1:
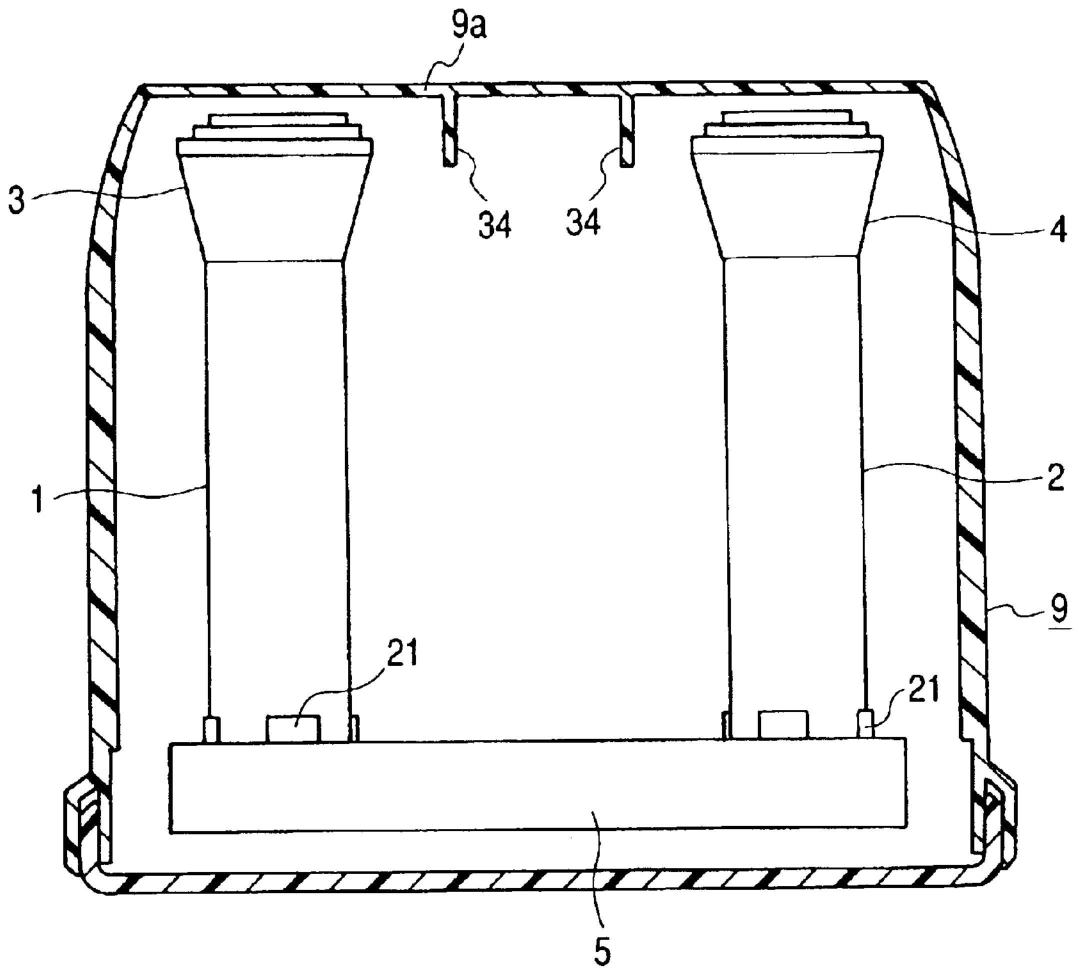
FIG. 1 is a cross-sectional view of a satellite broadcasting receiving converter according to an embodiment of the present invention.
Figure 2:
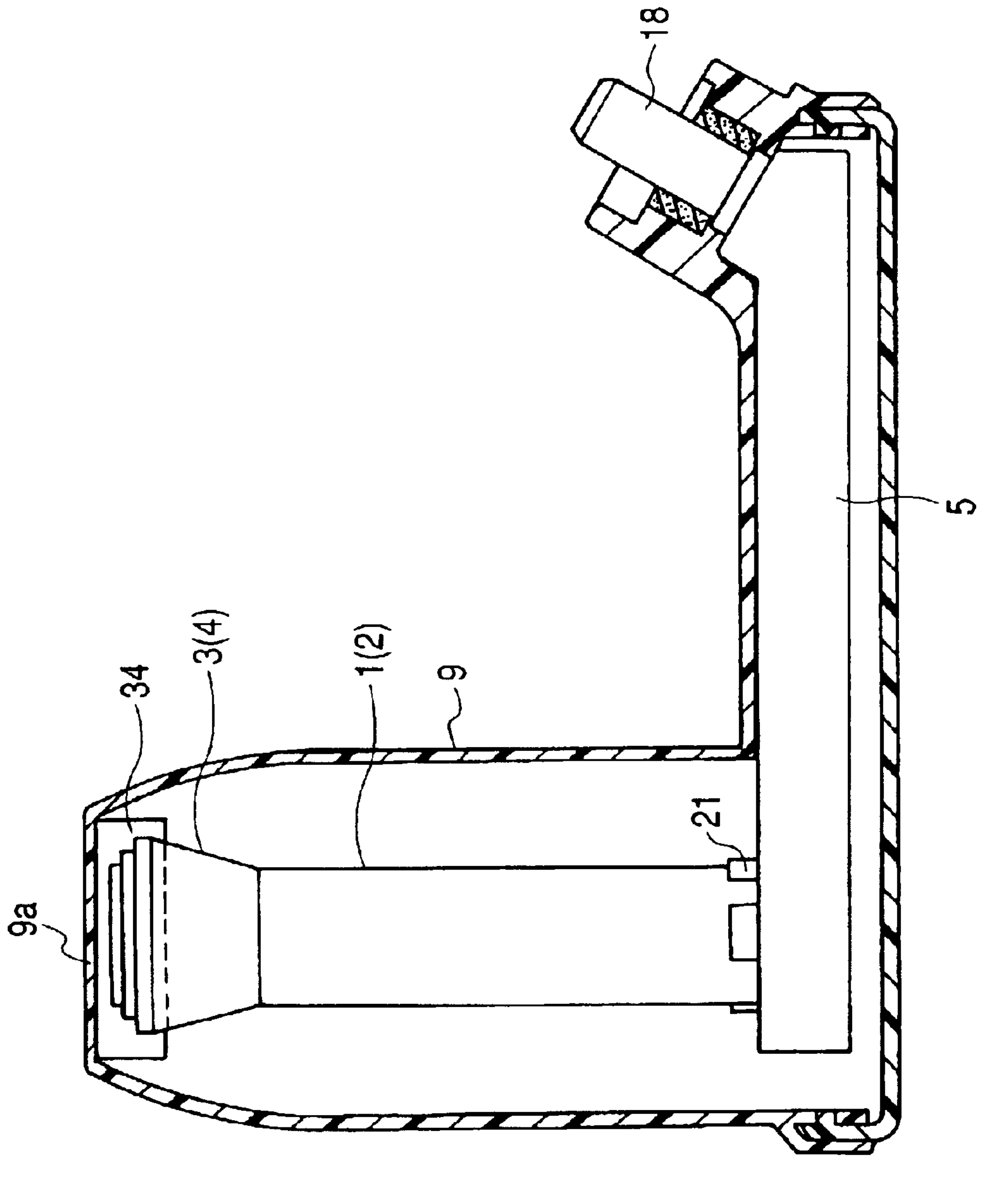
FIG. 2 is a cross-sectional view of the satellite broadcasting receiving converter as viewed from a different direction.
Figure 5:
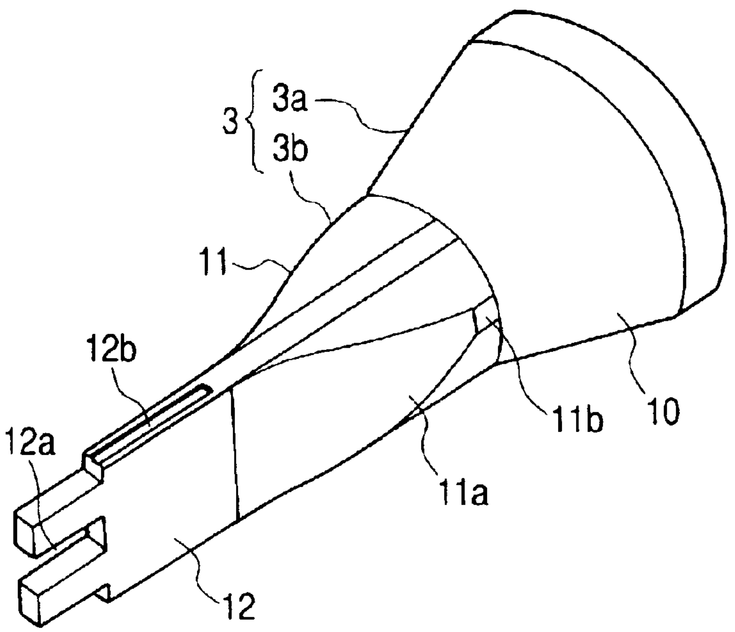
FIG. 5 is a perspective view of a dielectric feeder.
Figure 6:
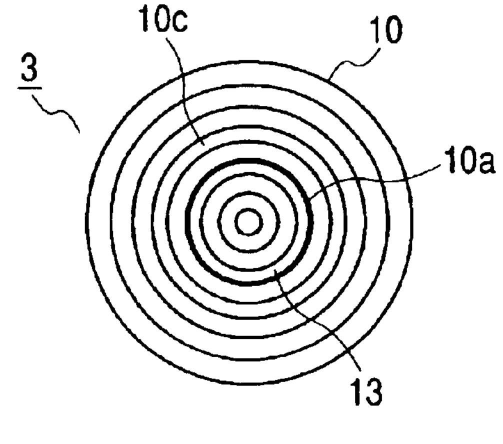
FIG. 6 is a front view of the dielectric feeder.
Figure 7:
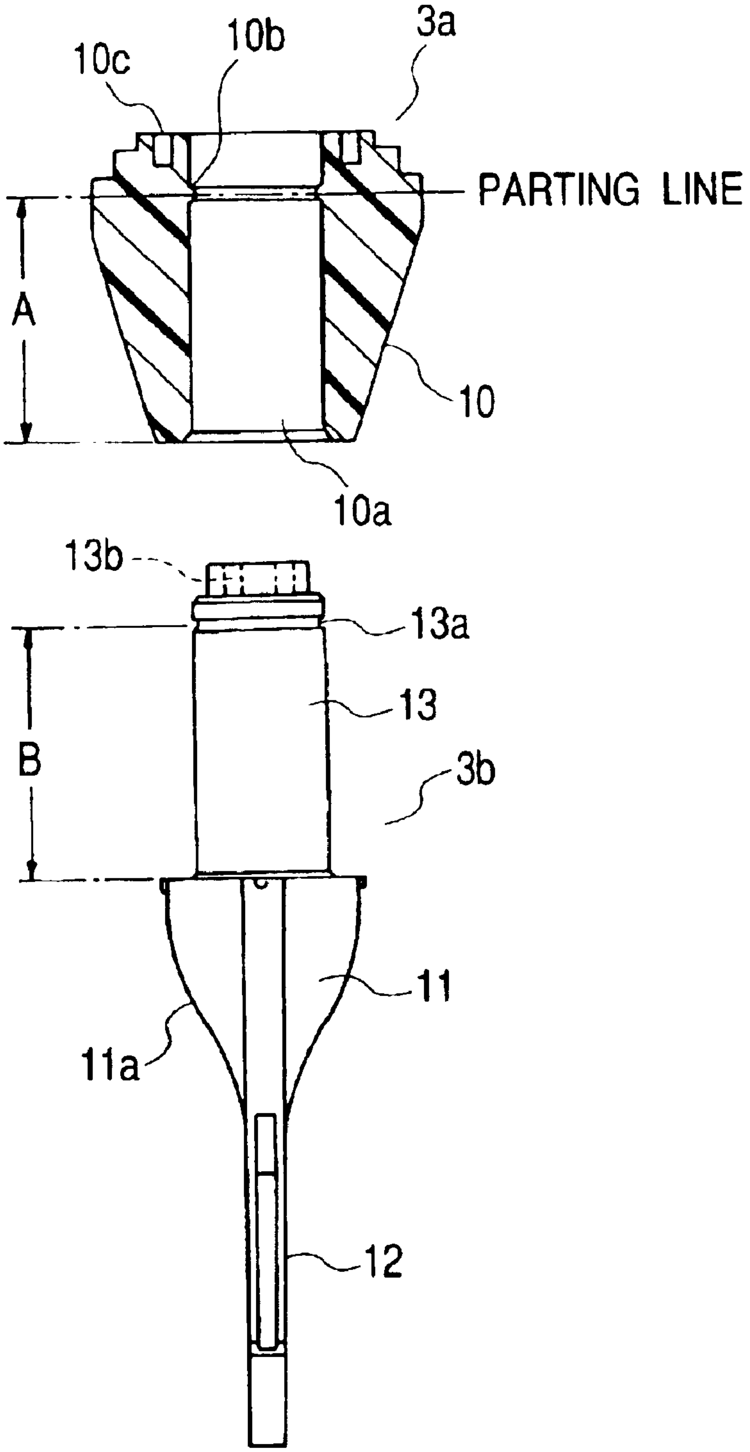
FIG. 7 is an explanatory view showing the dielectric feeder in an exploded manner.
Figure 8:
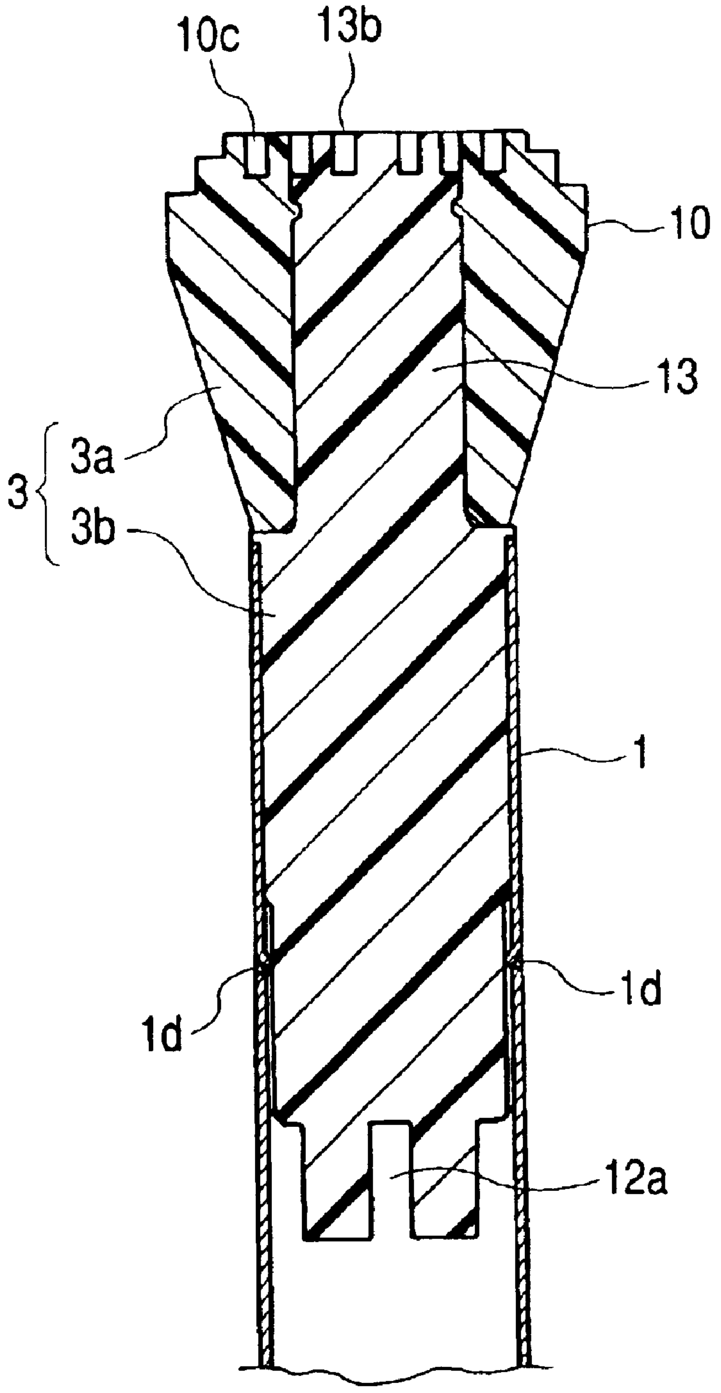
FIG. 8 is an explanatory view showing a state in which the dielectric feeder is mounted on the waveguide.
Figure 9:
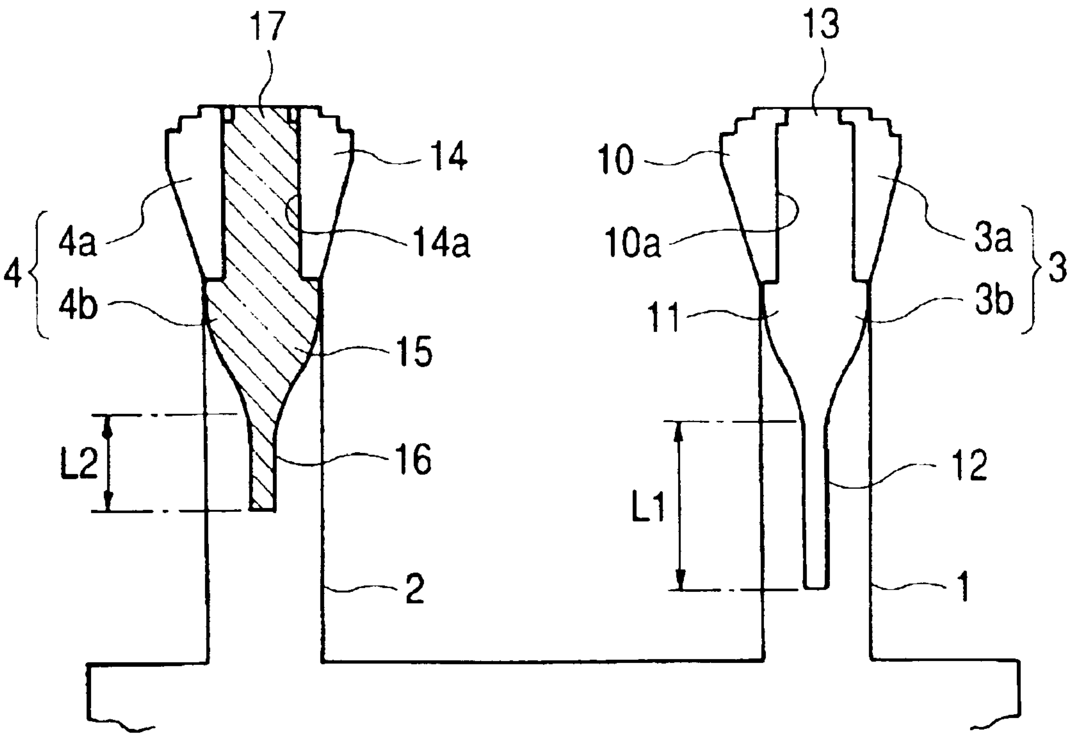
FIG. 9 is an explanatory view showing the difference between two dielectric feeders.
Figure 10:
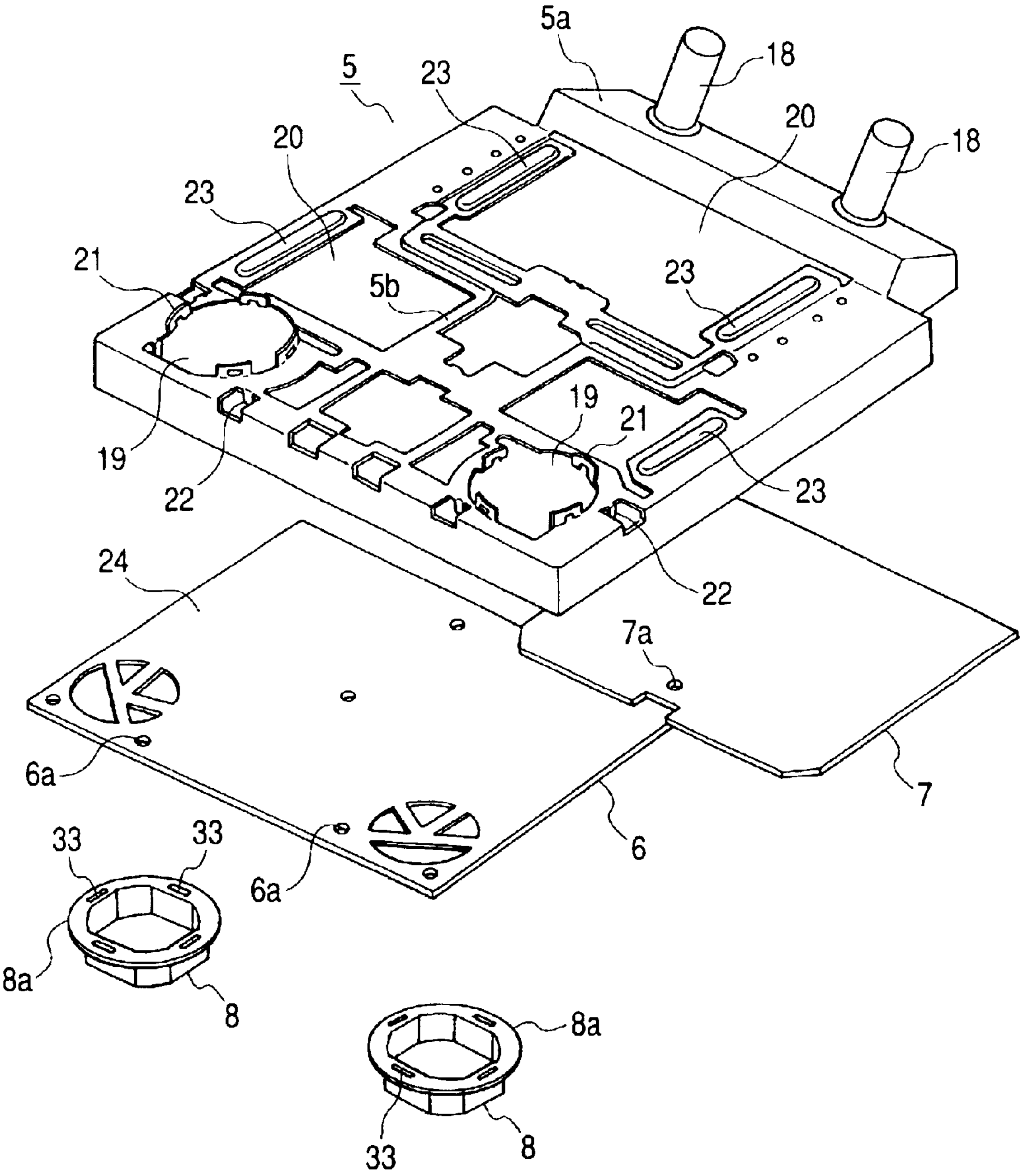
FIG. 10 is a perspective view showing a shield case, a printed circuit board and a short cap in an exploded manner.
Figure 11:
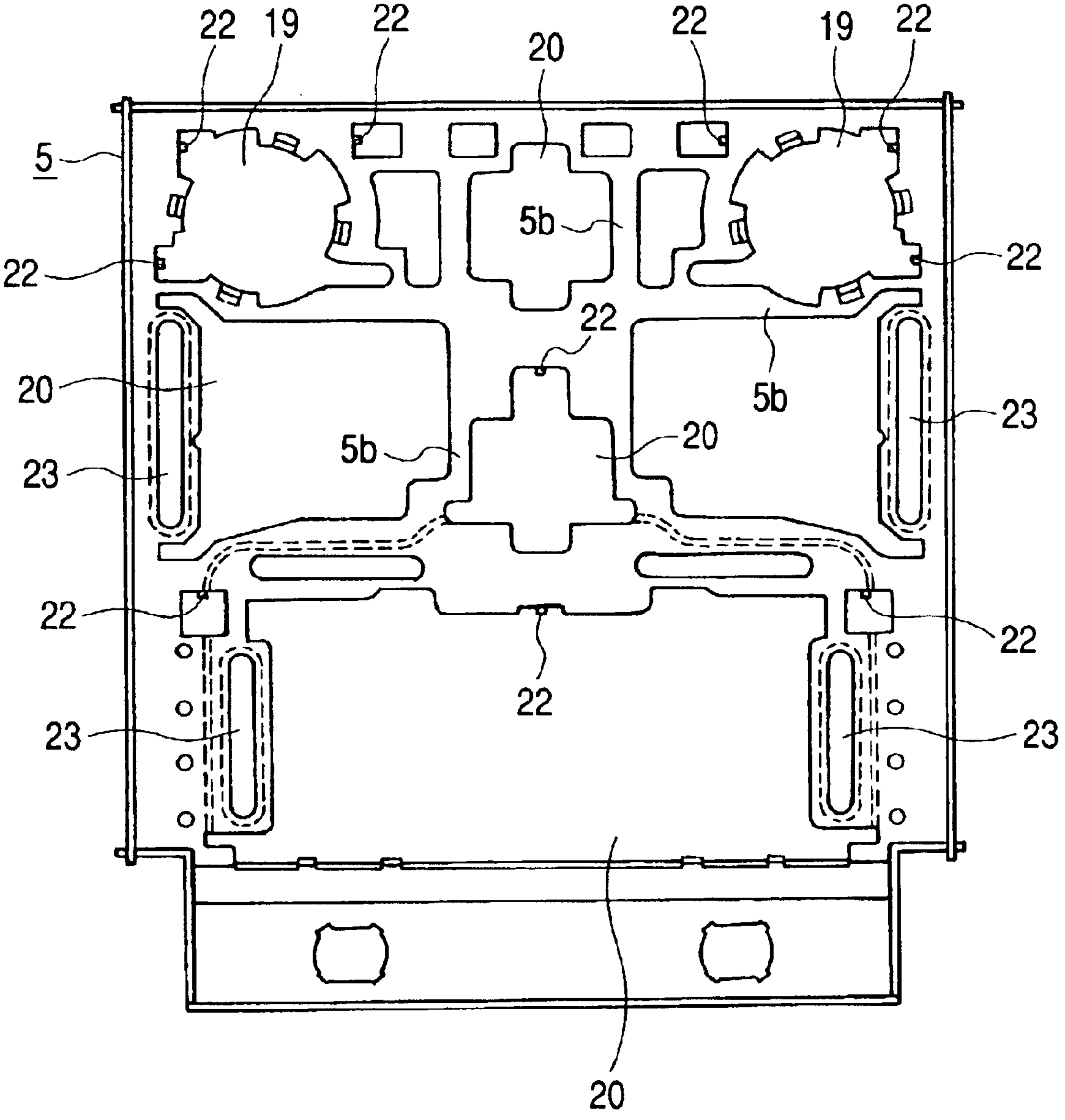
FIG. 11 is a back view of the shield case.
Figure 12:
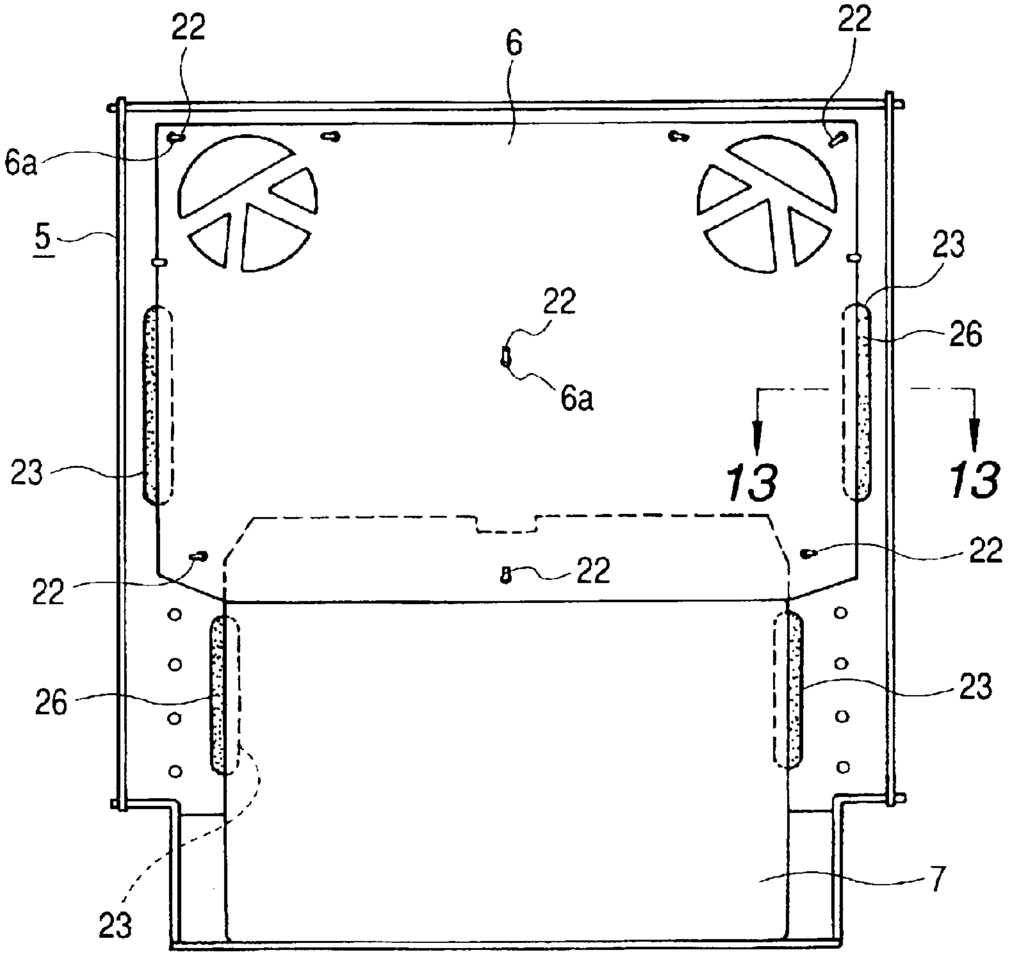
FIG. 12 is an explanatory view showing a state in which the printed circuit board is mounted on the shield case.
Figure 13:
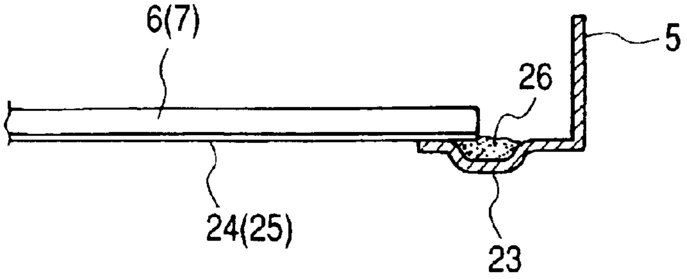
FIG. 13 is a cross-sectional view taken along a line 13—13 in FIG. 12.
Figure 14:
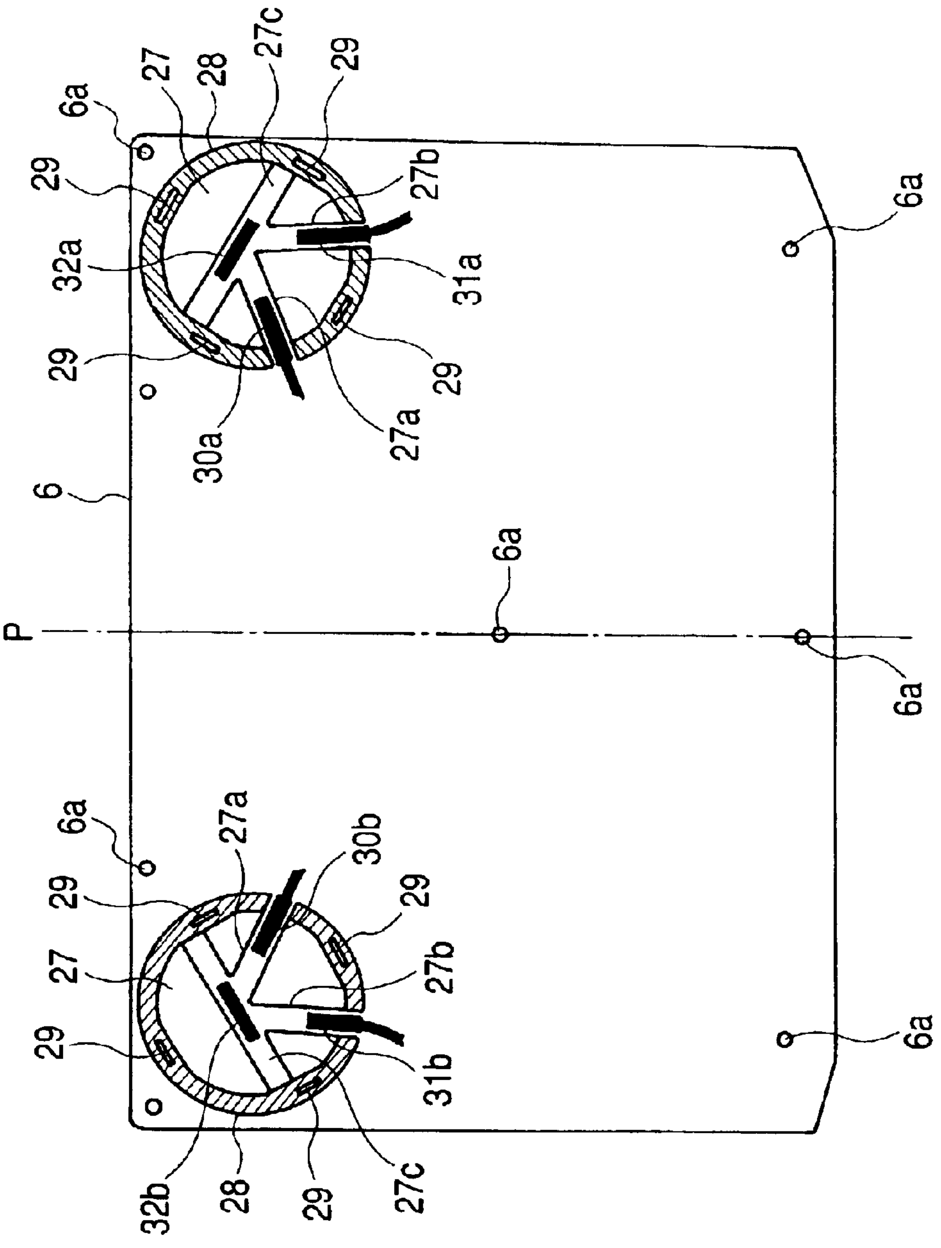
FIG. 14 is a view showing a part mounting surface of a first printed circuit board.
Figure 15:
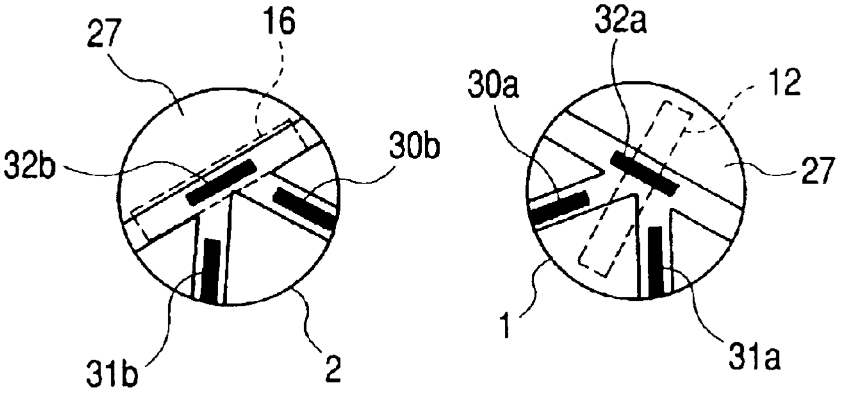
FIG. 15 is an explanatory view showing the positional relationship between a phase changing part of the dielectric feeder and a minute radiation pattern.
Figure 16:
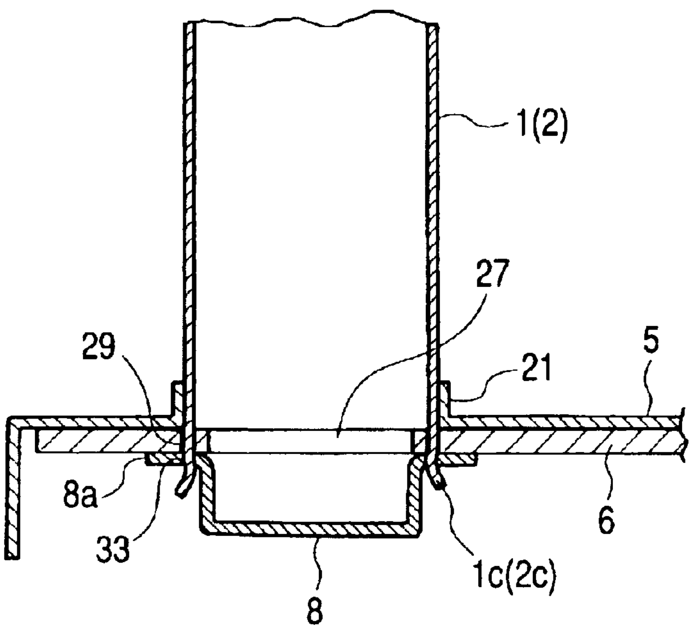
FIG. 16 is a cross-sectional view showing a state in which the waveguides, the printed circuit board and the short cap are mounted.
Figure 17:
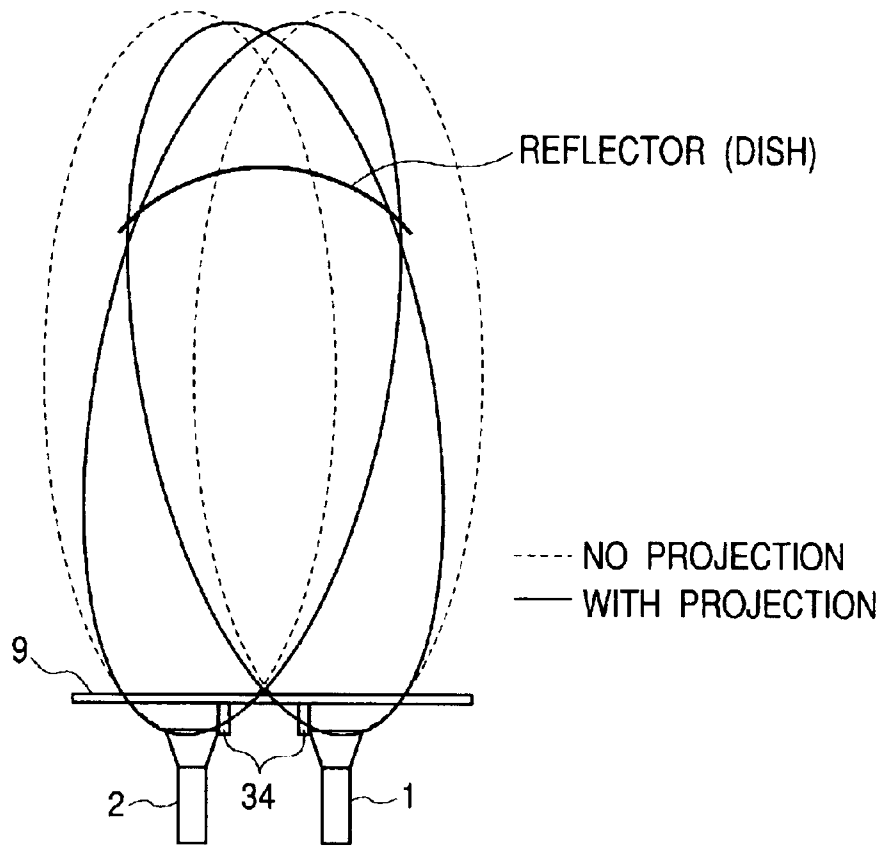
FIG. 17 is an explanatory view showing the relationship between a correction part of a waterproof cover and the radiation pattern.
Figure 18:
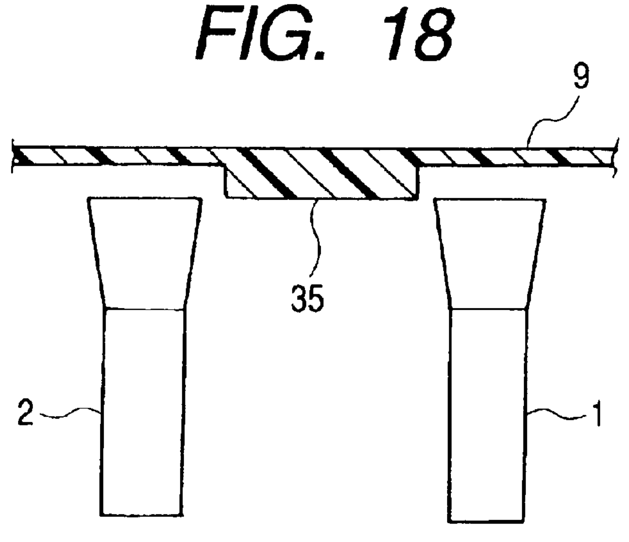
FIG. 18 is an explanatory view showing a modification of the correction part.
Figure 19:
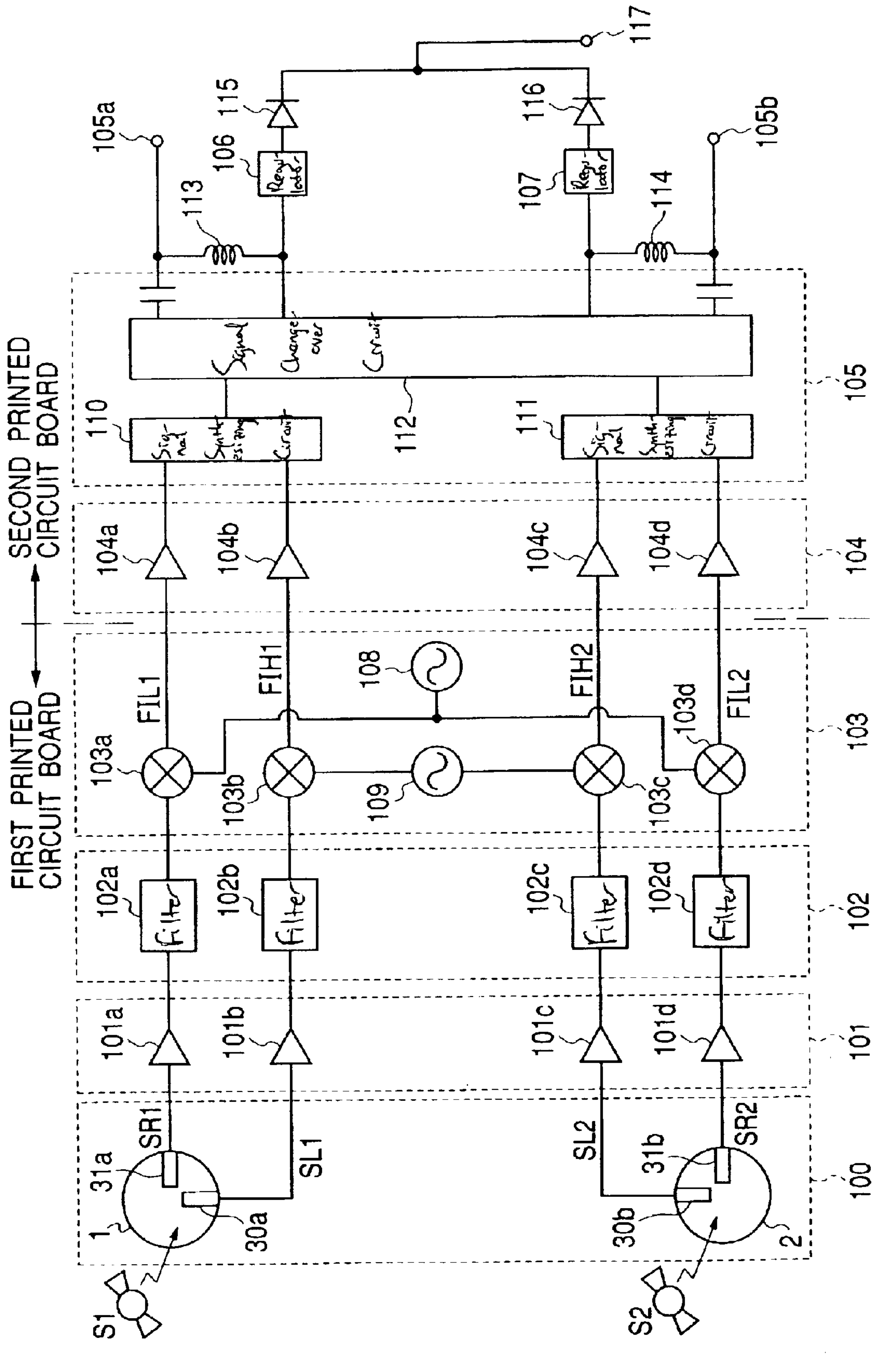
FIG. 19 is a block diagram of a converter circuit.
Figure 20:
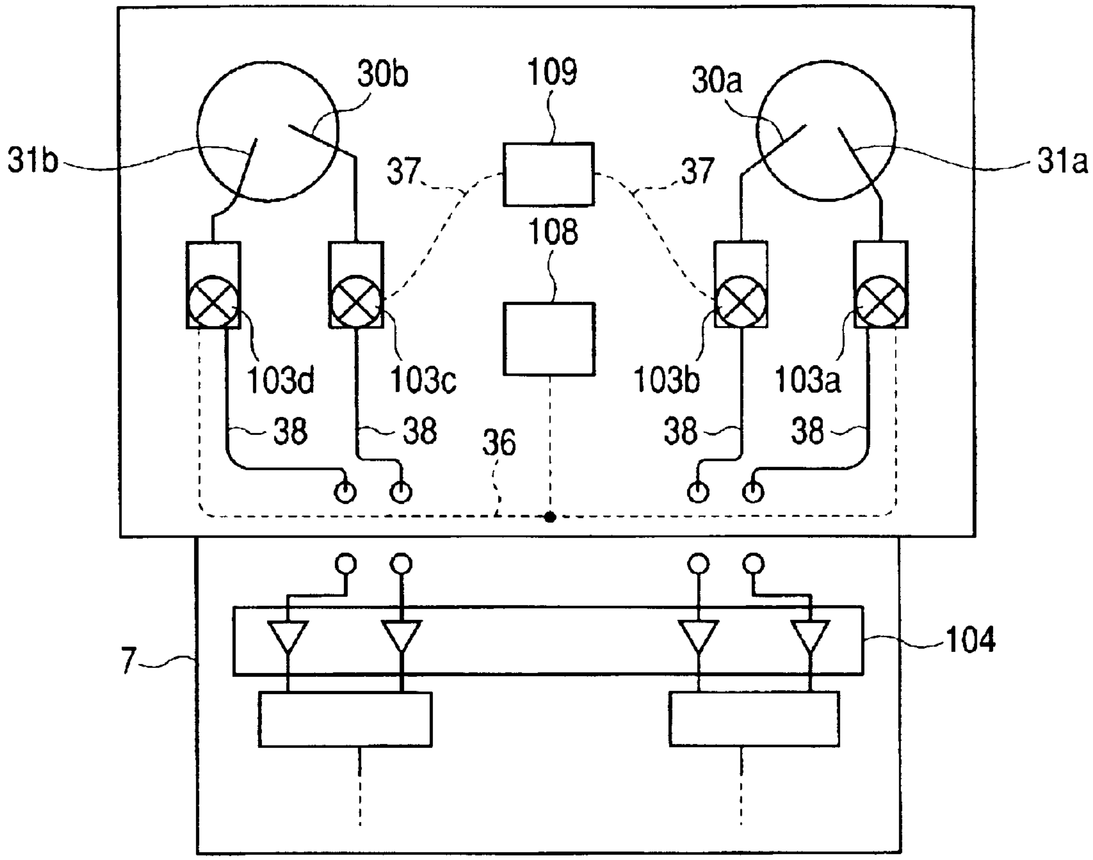
FIG. 20 is an explanatory view showing a state in which a layout of circuit parts is designed.
Figure 21:
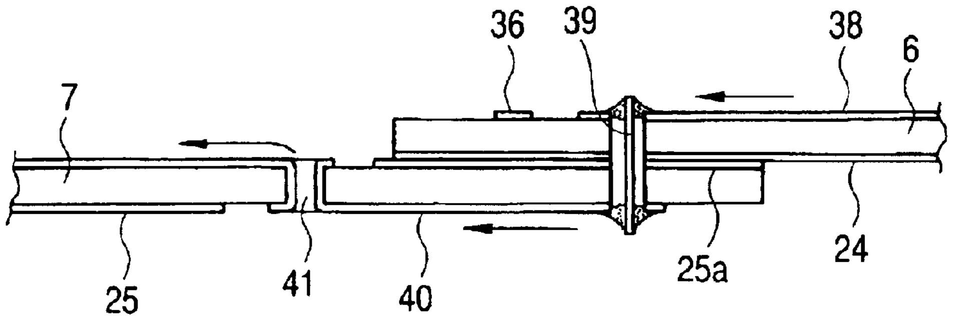
FIG. 21 is an explanatory view showing a bonding portion of two printed circuit boards in an exploded manner.

A preferred embodiment of the present invention is explained hereinafter in conjunction with attached drawings. In the drawings, FIG. 1 is a cross-sectional view of a satellite broadcasting receiving converter according to an embodiment of the present invention, FIG. 2 is a cross-sectional view of the satellite broadcasting receiving converter as viewed from a different direction, FIG. 3 is a perspective view of waveguides, FIG. 4 is a front view of the waveguide, FIG. 5 is a perspective view of a dielectric feeder, FIG. 6 is a front view of the dielectric feeder, FIG. 7 is an explanatory view showing the dielectric feeder in an exploded manner, FIG. 8 is an explanatory view showing a state in which the dielectric feeder is mounted on the waveguide, FIG. 9 is an explanatory view showing the difference between two dielectric feeders, FIG. 10 is a perspective view showing a shield case, a printed circuit board and a short cap in an exploded manner, FIG. 11 is a back view of the shield case, FIG. 12 is an explanatory view showing a state in which the printed circuit board is mounted on the shield case, FIG. 13 is a cross-sectional view taken along a line 13—13 in FIG. 12, FIG. 14 is a view showing a part mounting surface of a first printed circuit board, FIG. 15 is an explanatory view showing the positional relationship between a phase changing part of the dielectric feeder and a minute radiation pattern, FIG. 16 is a cross-sectional view showing a state in which the waveguides, the printed circuit board and the short cap are mounted, FIG. 17 is an explanatory view showing the relationship between a correction part of a waterproof cover and the radiation pattern, FIG. 18 is an explanatory view showing a modification of the correction part, FIG. 19 is a block diagram of a converter circuit, FIG. 20 is an explanatory view showing a state in which a layout of circuit parts is designed, and FIG. 21 is an explanatory view showing a bonding portion of two printed circuit boards in an exploded manner.

A satellite broadcasting receiving converter according to this embodiment includes first and second waveguides 1, 2, first and second dielectric feeders 3, 4 which are respectively held on distal portions of the waveguides 1, 2, a shield case 5, first and second printed circuit boards 6, 7 which are mounted inside the shield case 5, a pair of short caps 8 which close rear opening ends of respective waveguides 1, 2, a waterproof cover 9 which covers these parts and the like.

Figure 3:
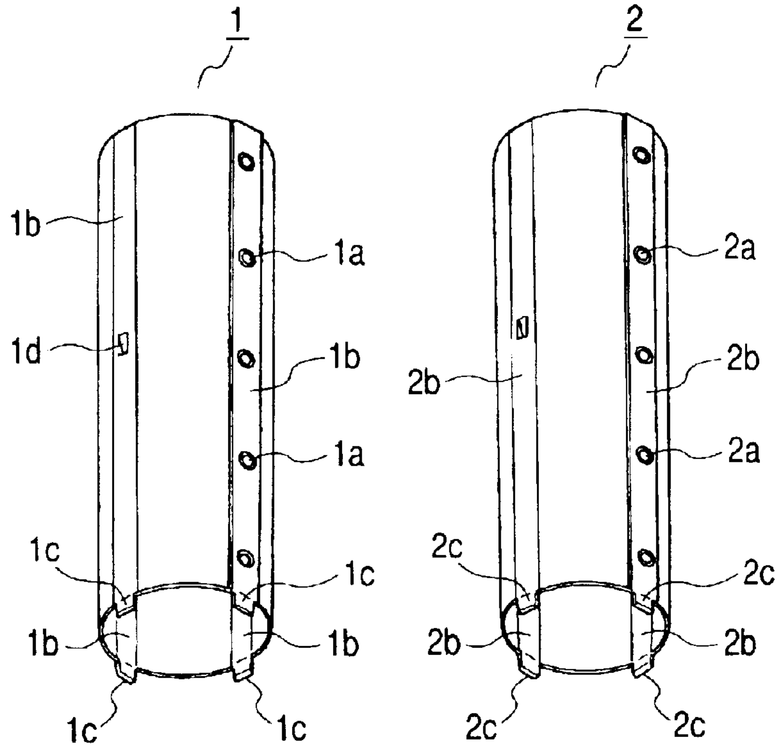
FIG. 3 is a perspective view of waveguides.
Figure 4:
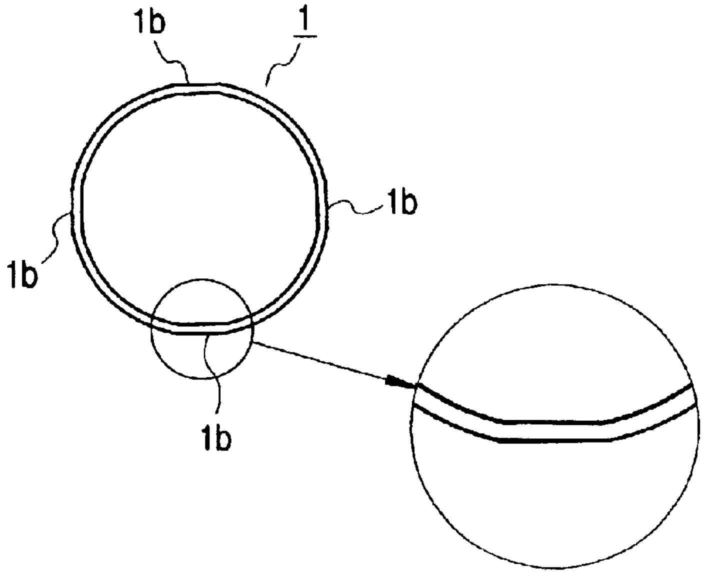
FIG. 4 is a front view of the waveguide.

As shown in FIG. 3 and FIG. 4, the first waveguide 1 is formed by winding a metal flat plate in a cylindrical shape, bonding both sides of the metal plate, and fixing the bonded portion using a plurality of caulkings 1*a*, wherein a distance between respective caulkings 1*a* is set to approximately ¼ of the waveguide length λg. Although the first waveguide 1 exhibits the substantially circular-sectional shape, four parallel parts 1*b* are formed on a peripheral surface thereof at an interval of approximately 90 degrees in the circumferential direction. Each parallel part 1*b* extends in the longitudinal direction parallel to the center axis of the first waveguide 1 and a snap pawl 1*c* is extended from a rear end thereof. Further, on respective middle portions of two parallel parts 1*b* which face each other in an opposed manner, stopper pawls 1*d* are formed and these stopper pawls 1*d* are projected into the inside of the first waveguide 1. The second waveguide 2 has completely the same constitution as that of the first waveguide 1. That is, the second waveguide 2 also has caulkings 2*a*, parallel parts 2*b*, snap pawls 2*c* and stopper pawls 2*d*. Accordingly the repeated explanation is omitted here.

Both of the first dielectric feeder 3 and the second dielectric feeder 4 are made of a synthetic resin material having a low dielectric dissipation factor (dielectric loss tangent). In this embodiment, the first dielectric feeder 3 and the second dielectric feeder 4 are made of inexpensive polyethylene (dielectric constant $\epsilon \approx 2.25$) in view of cost. As shown in FIG. 5 to FIG. 7, the first dielectric feeder 3 includes a first divided body 3*a* which has a radiation part 10 and a second divided body 3*b* which is constituted of an impedance converter 11 and a phase converter 12. The radiation part 10 has a conical shape which expands in a trumpet shape and a circular through hole 10*a* is formed at a center thereof. A fitting projection 10*b* is fitted on an inner peripheral surface of the through hole 10*a* and the first divided body 3*a* is removed from the mold using the fitting projection 10*b* as a parting line in performing an injection molding. Further, in an end surface of the radiation part 10 which is expanded toward the distal end thereof, annular grooves 10*c* are formed and a depth of these annular grooves 10*c* is set to approximately ¼ of a wavelength λ of radio waves which is propagated in the annular portion.

The impedance converter 11 includes a pair of curved surfaces 11*a* which are squeezed or tapered in an arcuate shape toward a phase converter 12 and a cross-sectional shape of the curved surfaces 11*a* approximates a quadratic curve. Although an end surface of the impedance converter 11 has an approximately circular shape, four flat mounting surfaces 11*b* are formed on a periphery thereof at an interval of approximately 90 degrees. Further, a cylindrical projection 13 is formed on the center of the end surface of the impedance converter 11 and fitting recess 13*a* is formed in an outer peripheral surface of the projection 13. When the projection 13 is injected into the through hole 10*a* and the end surface of the impedance converter 11 is abutted onto a rear end surface of the radiation part 11, the fitting recess 13*a* and the fitting projection 10*b* are engaged with each other in snap fitting in the inside of the through hole 10*a* so that the first divided body 3*a* and the second divided body 3*b* are integrally formed.

Here, assume that a length from the rear end surface of the radiation part 10 to the fitting projection lob as A and a length from the end surface of the impedance converter 11 to the fitting recess 13*a* as B, the size A is set slightly longer than the size B. Accordingly, at a point of time that the fitting recess 13*a* and the fitting projection 10*b* are engaged with each other in snap fitting, a force directed in the direction to bring the rear end surface of the radiation part 10 into pressure contact with the end surface of the impedance converter 11 is generated and hence, the first divided body 3*a* and the second divided body 3*b* are integrally formed without any play. Further, an annular groove 13*b* is also formed in a distal end surface of the projection 13 and both annular grooves 10*c*, 13*b* are arranged concentrically at a point of time that the first divided body 3*a* and the second divided body 3*b* are integrally formed.

The phase converter 12 is contiguously formed on the tapered portion of the impedance converter 11 and functions as a 90-degree phase shifter which converts circular polarization which enters the inside of the first dielectric feeder 3 into linear polarization. The phase converter 12 is formed of a plate member which has a substantially uniform thickness and is provided with a plurality of notches 12*a* at a distal end thereof. A depth of each notch 12*a* is set to approximately ¼ of the guide wavelength $\lambda g$ and an end surface of the phase converter 12 and a bottom surfaces of the notches 12*a* define two reflection surfaces which are arranged perpendicular to the advancing direction of radio waves. Further, elongated grooves 12*b* are formed on both side surfaces of the phase converter 12.

As shown in FIG. 8, the first dielectric feeder 3 having the above-mentioned constitution is held in the first waveguide 1, wherein the radiation part 10 of the first divided body 3*a* and the projection 13 of the second divided body 3*b* are protruded from the opening end of the first waveguide 1 and the impedance converter 11 and the phase converter 12 of the second divided body 3*b* are inserted into and fixed to the inside of the first waveguide 1. In such an operation, by pushing respective mounting surfaces 11*b* of the impedance converter 11 into the corresponding four parallel parts 1*b* formed on the inner peripheral surface of the first waveguide 1 and, at the same time, by pushing both side surfaces of the phase converter 12 into two parallel parts 1*b* which face in an opposed manner by 180 degrees, it is possible to easily mount the second divided body 3*b* in the first waveguide 1 with high positional accuracy. Further, since the stopper pawls 1*d* formed on two parallel parts 1*b* are caught in the elongated grooves 12*b* of the phase converter 12, the removal of the second divided body 3*b* from the first waveguide 1 can be surely prevented.

The second dielectric feeder 4 has the basic structure which is equal to that of the basic structure of the first dielectric feeder 3. That is, the second dielectric feeder 4 includes a first divided body 4*a* having a radiation part 14 and a second divided body 4*b* which is constituted of an impedance converter 15 and a phase converter 16, and a projection 17 of the second divided body 4*b* is inserted into and fixed to a through hole 14*a* of the first divided body 4*a*. However, the second dielectric feeder 4 differs from the first dielectric feeder 3 with respect to following two points. The first different point is that they differ in the lengths of both phase converters 12, 16. That is, to compare the length L1 of the phase converter 12 of the first dielectric feeder 3 with the length L2 of the phase converter 16 of the second dielectric feeder 4, the relationship L1>L2 is established. The second different point lies in that they differ in colors of both second divided bodies 3*b*, 4*b*. For example, the second divided body 3*b* of the first dielectric feeder 3 is formed in the color of original material by injection molding and the second divided body 4*b* of the second dielectric feeder 4 is formed by injection molding while applying color such as red or blue to original material.

That is, among respective components of the first dielectric feeder 3 and the second dielectric feeder 4, both first divided bodies 3*a*, 4*a* constitute common parts and both second divided bodies 3*b*, 4*b* constitute separate parts which differ in lengths of respective phase converters 12, 16 and color. Although the reason that the lengths of both phase converters 12, 16 are made different from each other will be explained later, when the colors of both second divided bodies 3*b*, 4*b* are changed, as shown in FIG. 9, when the first dielectric feeder 3 and the second dielectric feeder 4 are respectively held by the corresponding first and second waveguides 1, 2, colors of the projections 13, 17 exposed on the end surfaces of both first divided bodies 3*a*, 4*a* can be observed with the naked eye and hence, an erroneous insertion of both second divided bodies 3*b*, 4*b* can be easily and surely checked.

As shown in FIG. 10 to FIG. 13, the shield case 5 is formed by making a metal plate subjected to press forming, wherein a pair of connectors 18 are mounted on a slanted surface 5*a* formed at one side of the shield case 5. In a planar top plate of the shield case 5, a pair of through holes 19 and a plurality of apertures 20 are formed, wherein a plurality of supports 21 are formed on a periphery of each through hole 19 having a circular shape by bending the supports 21 at a right angle toward the outside. Further, a plurality of bridges 5*b* which are surrounded by respective apertures 20 are formed on the top plate of the shield case 5 and a plurality of engaging pawls 22 are formed on outer peripheries of these bridges 5*b* by bending them toward the inside of the shield case 5 at a right angle. Further, on back surfaces of the bridges 5*b* of the shield case 5, a plurality of recesses 23 are formed and these recesses 23 are formed in an elongated shape along the outer peripheries of the apertures 20.

The first printed circuit board 6 is made of fluororesin-based material exhibiting a low dielectric constant and low dielectric loss such as polytetrafluoroethylene. A profile of the first printed circuit board 6 is formed larger than a profile of the second printed circuit board 7. A plurality of through holes 6*a* are formed in the first printed circuit board 6 at suitable positions. The second printed circuit board 7 is made of a material such as epoxy resin containing glass having a lower Q value compared to the material of the first printed circuit board 6. One through hole 7*a* is formed in the second printed circuit board 7. Further, ground patterns 24, 25 are respectively formed on one surface of each of the first and second printed circuit boards 6, 7 and these ground patterns 24, 25 are soldered to the shield case 5 using solder 26 filled in respective recesses 23 formed in the shield case 5. In this case, in a state that cream solder is preliminary filled inside respective recesses 23, the ground patterns 24, 25 of both printed circuit boards 6, 7 are laminated to the back surface of the top plate of the shield case 5 and, thereafter, the cream solder is fused by a reflow furnace or the like whereby the both printed circuit boards 6, 7 can be easily and surely grounded to the shield case 5. Here, as shown in FIG. 12 and FIG. 13, by exposing portions of respective recesses 23 outwardly from outer peripheries of both printed circuit boards 6, 7, the failure such as an insufficient amount of solder can be easily checked by the naked eye and hence, it is easy to replenish a lacking amount of solder.

Further, the first and second printed circuit boards 6, 7 are not only soldered to the shield case 5 but also are engaged with the rear surface of the top plate of the shield case 5 using respective engaging pawls 22. In this case, by inserting respective pawls 22 of the shield case 5 into respective through holes 6*a*, 7*a* of both printed circuit boards 6, 7 and, thereafter, by bending these engaging pawls 22 to the plate surface side of the first printed circuit board 6, both printed circuit boards 6, 7 can be fixedly engaged with the shield case 5. Particularly, to consider the first printed circuit board 6 which is larger than the second printed circuit board 7 in size, since suitable portions including the center and the peripheries are pushed to the rear surface of the top plate of the shield case 5 by means of a plurality of engaging pawls 22, it is possible to surely correct warping of the first printed circuit board 6.

As shown in FIG. 14 and FIG. 15, a pair of circular holes 27 are formed in the first printed circuit board 6 and first to third bridges 27$a$ to 27$c$ are formed inside the circular holes 27. In the state that the first printed circuit board 6 is fixedly secured to the inside of the shield case 5, both circular holes 27 are respectively aligned with the through holes 19 formed in the shield case 5. The first bridge 27$a$ and the second bridge 27$b$ intersect at an angle of approximately 90 degrees and the third bridge 27$c$ intersects the first and second bridges 27$a$, 27$b$ at an angle of approximately 45 degrees. However, respective bridges 27$a$ to 27$c$ at the left side in the drawing and respective bridges 27$a$ to 27$c$ at the right side in the drawing are arranged in a linear symmetry with respect to a straight line P which passes the center of the first printed circuit board 6. The side of the first printed circuit board 6 which constitutes a side opposite to the ground pattern 24 constitutes a part mounting surface. Annular earth patterns 28 are formed on peripheries of both circular holes 27 on this part mounting surface. These earth patterns 28 are made conductive with the ground patterns 24 via through holes. Four mounting holes 29 are respectively formed inside each earth pattern 28 in a circumferentially spaced-apart manner at an interval of approximately 90 degrees. Each mounting hole 29 has a rectangular shape. Four mounting holes 29 at the left side of the drawing and four mounting holes 29 at the right side of the drawing are also positioned in a linear symmetry with respect to the above-mentioned straight line P.

Further, on the part mounting surface of the first printed circuit board 6, a pair of first probes 30$a$, 30$b$ which are positioned above both first bridges 27$a$, a pair of second probes 31$a$, 31$b$ which are positioned above both second bridges 27$b$, and a pair of minute irradiation patterns 32$a$, 32$b$ which are positioned above both third bridges 27$c$ are respectively formed by patterning. Accordingly, respective pairs of first probes 30$a$, 30$b$, a pair of second probes 31$a$, 31$b$ and a pair of minute irradiation patterns 32$a$, 32$b$ arranged at both left and right sides are positioned in a linear symmetry with respect to the above-mentioned straight line P. In the explanation described hereinafter, the minute radiation pattern 32$a$ at the right side in FIG. 14 is referred to as the first minute radiation pattern and the minute radiation pattern 32$b$ at the left side in FIG. 14 is referred to as the second minute radiation pattern.

The short cap 8 is formed by making a metal plate subjected to press forming. As shown in FIG. 10, the short cap 8 has a bottomed structure and a flange 8$a$ is formed on an opening end side of the short cap 8. Four mounting holes 33 are respectively formed in the flange 8$a$ in a circumferentially spaced-apart manner at an interval of approximately 90 degrees. Each mounting hole 33 has a rectangular shape. The short caps 8 function as end surfaces which close rear opening ends of both waveguides 1, 2. As shown in FIG. 15, the short caps 8 and the first and second waveguides 1, 2 are integrally formed by way of th first printed circuit board 6. That is, respective snap pawls 1$c$, 2$c$ of the first and second waveguides 1, 2 are projected to the back surface side after passing through respective mounting holes 29 formed in the first printed circuit board 6. By making these snap pawls 1$c$, 2$c$ engaged with respective mounting holes 33 of the short caps 8 in snap fitting, it is possible to sandwich and fix the first printed circuit board 6 between both waveguides 1, 2 and a pair of short caps 8. Here, cream solder is preliminary applied onto the earth patterns 28 of the first printed circuit board 6. Accordingly, by fusing the cream solder using a reflow furnace after engaging the short caps 8 by snap fitting, it is possible to solder the short caps 8 to the earth patterns 28 of the first printed circuit board 6.

Further, as described above, the first printed circuit board 6 is fixed to the inside of the shield case 5, and the first waveguide 1 and the second waveguide 2 are respectively fixed to the first printed circuit board 6 in a state that the printed circuit boards 1, 2 are arranged perpendicular to the first printed circuit board 6 and are projected toward the outside from the first printed circuit board 6 after passing through the through holes 19 formed in the shield case 5. Here, both waveguides 1, 2 are brought into contact with respective supports 21 formed on the peripheries of the through holes 19, wherein an undesired deformation such as inclination of both waveguides 1, 2 can be prevented due to such supports 21. Here, openings of the shield case 5 which are formed at a side opposite to the side from which both waveguides 1, 2 are projected are covered with a cover not shown in the drawing.

Returning now to FIG. 1 and FIG. 2, respective parts including both waveguides 1, 2, both dielectric feeders 3, 4 and the shield case 5 which have been described above are accommodated in the waterproof cover 9 and a pair of connectors 18 are projected outside from the waterproof cover 9. The waterproof cover 9 is formed of a dielectric material such as polypropylene and ASA resin which exhibits excellent weatherability. The radiation parts 10, 14 of both dielectric feeders 3, 4 face a front surface 9$a$ of the waterproof cover 9 in an opposed manner. A pair of projection walls 34 are formed on the approximately center of the front surface 9$a$ and both projection walls 34 extend in a traversing manner between the first and second waveguides 1, 2. These projection walls 34 function as correction parts. That is, since the phase of the radio waves which pass the waterproof cover 9 is delayed by the projection walls 34, the radiation patterns of radio waves incident on both waveguides 1, 2 can be corrected in accordance with a volume ratio of the projection walls 34. Accordingly, as shown in FIG. 17, it is possible to correct the irradiation patterns from a shape indicated by a broken line (case having no projection wall 34) into a shape indicated by a solid line whereby a miniaturized reflector (dish) can be used. Here, as shown in FIG. 18, the correction part may be constituted by forming a thick wall 35 at the approximately center of the front surface 9$a$ of the waterproof cover 9.

The satellite broadcasting receiving converter according to the present invention receives radio waves transmitted from two neighboring satellites (first satellite S1 and the second satellite S2) which are launched to sky. The leftward and rightward circularly polarized signals are respectively transmitted from the first satellite S1 and the second satellite S2, are converged by the reflector and, thereafter, are inputted to the inside of the first and second waveguides 1, 2 after passing the waterproof cover 9. For example, the leftward and rightward circularly polarized signals which are respectively transmitted from the first satellite S1 enter the inside of the first dielectric feeder 3 through the radiation part 10 and the end surface of the projection 13 and are propagated from the radiation part 10 to the phase converter 12 by way of the impedance converter 11 in the inside of the first dielectric feeder 3. Thereafter, the circularly polarized signals are converted into the linear polarized signals in the phase converter 12 and enter the inside of the first waveguide 1. That is, the circular polarization is a polarization in which a product vector of two linear polarizations which have an equal amplitude and a phase difference of 90 degrees from each other is rotated and hence, when the circularly polarized signals are propagated in the inside of the phase converter 12, phases which are shifted by 90 degrees from each other assume the same phase so that, for example, the leftward circularly circular polarized signals are converted into the vertically polarized signals and the rightward circularly polarized signals are converted into the horizontally polarized signals.

Here, since a plurality of annular grooves 10c, 13b having the depth of approximately λ/4 wavelength are formed on the end surface of the first dielectric feeder 3, the phase of the radio waves which are reflected on the end surface of the radiation part 10 and the bottom surfaces of the annular grooves 10c, 13b is inverted and cancelled whereby the reflection components of the radio waves which are directed to the end surface of the radiation part 10 can be significantly reduced. Further, since the radiation part 10 has a trumpet shape which is expanded from the front opening end of the first waveguide 1, it is possible to efficiently converge the radio waves inside the first dielectric feeder 3 and, at the same time, the length of the radiation part 10 in the axial direction can be shortened.

Further, the impedance converter 11 is formed between the radiation part 10 and the phase converter 12 of the first dielectric feeder 3 and, at the same time, the cross-sectional shape of a pair of curved surfaces 11a formed on the impedance converter 11 is formed to approximate the contiguous quadratic curved line so as to converge the thickness of the first dielectric feeder 3 such that the thickness is gradually made thinner from the radiation part 10 to the phase converter 12. Accordingly, in addition to an advantageous effect that the reflection components of the radio waves which propagate inside the first dielectric feeder 3 can be effectively reduced, it is also possible to obtain an advantageous effect that even when the length of the portion ranging from the impedance converter 11 to the phase converter 12 is shortened, the phase difference with respect to the linear polarized signals is increased and hence, the total length of the first dielectric feeder 3 can be significantly shortened from this point of view.

Further, since the notches 12a having the depth of approximately λg/4 wavelength is formed on the end surface of the phase converter 12, the phase of the radio waves reflected on the bottom surface of the notches 12a and the end surface of the phase converter 12 are inverted and cancelled so that mismatching of impedance on the end surface of the phase converter 12 can be eliminated.

The leftward and rightward circularly polarized signals transmitted from the first satellite S1 are, in the above-mentioned manner, converted into the vertically and horizontally polarized signals in the phase converter 12 of the first dielectric feeder 3 and, thereafter, advance toward the short cap 8 inside the first waveguide 1, wherein the vertically polarized signal is detected by the first probe 30a and the horizontally polarized signal is detected by the second probe 31a. In the same manner, the leftward and rightward circularly polarized signals transmitted from the second satellite S2 enter the inside of the second dielectric feeder 4 from the irradiation part 14 and the end surface of the projection 17. Then, in the phase converter 16 of the second dielectric feeder 4, the leftward circularly polarized signal is converted into the vertically polarized signal and the rightward circularly polarized signal is converted into the horizontally polarized signal. Then, the vertically polarized signal and horizontally polarized signal advance toward the short cap 8 in the inside of the second waveguide 2, wherein the vertically polarized signal is detected by the first probe 30b and the horizontally polarized signal is detected by the second probe 31b.

Here, on the first printed circuit board 6, the first and second minute radiation patterns 32a, 32b are formed, wherein the first minute radiation pattern 32a intersects the respective axes of the first and second probes 30a, 31a at an angle of approximately 45 degrees and the second minute radiation pattern 32b also intersects the respective axes of the first and second probes 30b, 31b at an angle of approximately 45 degrees. Accordingly, the disturbances of electric fields of the vertically polarized signals and the horizontally polarized signals in both of the first and second waveguides 1, 2 are respectively suppressed by the first and second minute radiation patterns 32a, 32b and hence, the isolation between the vertically polarized signals and the horizontally polarized signals is ensured. Further, the first and second minute radiation patterns 32a, 32b are formed in an asymmetrical rectangular shape with respect to axes of respective probes 30a, 31a, 30b, 31b and hence, the sizes (areas) of these patterns can be set to relatively small values whereby it is possible to reduce the reflection at the first and second minute radiation patterns 32a, 32b while ensuring the isolation between the vertically polarized signals and the horizontally polarized signals.

However, the first and second minute radiation patterns 32a, 32b assume the linearly symmetrical position with respect to the above-mentioned straight line P on the first printed circuit board 6. Accordingly, as can be clearly understood from FIG. 15, the first minute radiation patterns 32a intersect the phase converter 12 of the first dielectric feeder 3 at an approximately right angle, while the second minute radiation patterns 32b are arranged substantially parallel to the phase converter 16 of the second dielectric feeder 4. In this case, compared to the distribution of electric field inside the second waveguide 2 where the second minute radiation pattern 32b is arranged substantially parallel to the phase converter 16, the distribution of electric field in the inside of the first waveguide 1 where the first minute radiation pattern 32a intersects the phase converter 12 at an approximately right angle is worsened. This worsening of the distribution of electric field is corrected by elongating the size of the phase converter 12 in the axial direction. That is, as mentioned previously, with respect to the length L1 of the phase converter 12 of the first dielectric feeder 3 and the length L2 of the phase converter 16 of the second dielectric feeder 4, the relationship of L1>L2 is established (see FIG. 9). Accordingly, by elongating the size of the phase converter 12, it is possible to prevent the generation of phase shift with respect to the linearly polarized signal which advances inside the first waveguide.

The reception signals detected by the first probes 30a, 30b and the second probes 31a, 31b are subjected to the frequency conversion in a converter circuit mounted on the first and second printed circuit boards 6, 7 and are converted into IF frequency signals and are outputted thereafter. As shown in FIG. 19, the converter circuit includes a satellite broadcasting signal inputting end 100 which receives satellite broadcasting signals transmitted from the first satellite S1 and the second satellite S2 and transmits the signals to a succeeding circuit, a reception signal amplifying circuit 101 which amplifies the inputted satellite broadcasting signals and outputs amplified signals, a filter 102 which attenuates an image frequency band of the inputted satellite broadcasting signals, a frequency converter 103 which applies the frequency conversion to the satellite broadcasting signal outputted from the filter 102, an intermediate frequency amplifying circuit 104 which amplifies the signals outputted from the frequency converter 103, signal selecting means 105 which selects a signal from the satellite broadcasting signals amplified by the intermediate frequency amplifying circuit 104 and outputs the selected signal, first and second regulators 106, 107 which supply a power source voltage to respective circuits such as the reception signal amplifying circuit 101, the filter 102 and the signal selecting means 105.

From the first satellite S1 and the second satellite 2, the satellite broadcasting signals of 12.2 GHz to 12.7 GHz having the leftward and rightward circular polarizations are transmitted. These satellite broadcasting signals are converged by the reflector of an outdoor antenna device and are inputted to the satellite broadcasting signal inputting end 100. The satellite broadcasting signal inputting end 100 includes the first and second probes 30*a*, 31*a* which detect the leftward and rightward circularly polarized signals transmitted from the first satellite S1 and the first and second probes 30*b*, 31*b* which detect the leftward and rightward circularly polarized signals transmitted from the second satellite S2. As described previously, the leftward circularly and rightward circularly polarized signals transmitted from the first satellite S1 are converted into the vertically polarized signal and the horizontally polarized signal and are detected by the first and second probes 30*a*, 31*a* respectively, wherein the first probe 30*a* outputs the leftward circularly polarized signal SL1 and the second probe 31*a* outputs the rightward circularly polarized signal SR1. On the other hand, the leftward and rightward circularly polarized signals transmitted from the second satellite S2 are converted into the vertically polarized signal and the horizontally polarized signal and are detected by the first and second probes 30*b*, 31*b* respectively, wherein the first probe 30*b* outputs the leftward circularly polarized signal SL2 and the second probe 31*b* outputs the rightward circularly polarized signal SR2.

The reception signal amplifying circuit 101 includes first to fourth amplifiers 101*a*, 101*b*, 101*c*, 101*d*. Here, the first amplifier 101*a* amplifies the rightward circularly polarized signal SR1, the second amplifier 101*b* amplifies the leftward circularly polarized signal SL1, the third amplifier 101*c* amplifies the leftward circularly polarized signal SL2, and the fourth amplifier 101*d* amplifies the rightward circularly polarized signal SR2. After being amplified to a given level, these signals are outputted to the filter 102.

The filter 102 has first to fourth band elimination filters 102*a*, 102*b*, 102*c*, 102*d*. The first and fourth band elimination filters 102*a*, 102*d* attenuate the frequency band of 9.8 GHz to 10.3 GHz which constitutes image frequency bands of the first intermediate frequency signals FIL1 and the fourth intermediate frequency signals FIL2, while the second and third band elimination filters 102*b*, 102*c* attenuate the frequency band of 16.0 GHz to 16.5 GHz which constitutes image frequency bands of the second intermediate frequency signals FHL1 and the third intermediate frequency signals FHL2. Then, the rightward circularly polarized signal SR1 is outputted to the frequency converter 103 after passing the first band elimination filter 102*a*. The leftward circularly polarized signal SL1 is outputted to the frequency converter 103 after passing the second band elimination filter 102*b*. The leftward circularly polarized signal SL2 is outputted to the frequency converter 103 after passing the third band elimination filter 102*c*. The rightward circularly polarized signal SR2 is outputted to the frequency converter 103 after passing the fourth band elimination filter 102*d*.

The frequency converter 103 includes first to fourth mixers 103*a*, 103*b*, 103*c*, 103*d*, a first oscillator 108 and a second oscillator 109. The first oscillator 108 (oscillation frequency=11.25 GHz) is connected to the first mixer 103*a* and the fourth mixer 103*d*. The satellite broadcasting signals outputted from the first band elimination filter 102*a* are subjected to frequency conversion in the first mixer 103*a* and are converted into the first intermediate frequency signal FIL1 of 950 MHz to 1450 MHz, and the satellite broadcasting signals outputted from the fourth band elimination filter 102*d* are also subjected to frequency conversion in the fourth mixer 103*d* and are converted into the fourth intermediate frequency signal FIL2 of 950 MHz to 1450 MHz. On the other hand, the second oscillator 109 (oscillation frequency=14.35 GHz) is connected to the second mixer 103 band the third mixer 103*c*. The satellite broadcasting signals outputted from the second band elimination filter 102*b* are subjected to the frequency conversion in the second mixer 103*b* and are converted into the second intermediate frequency signal FIH1 of 1650 MHz to 2150 MHz, and the satellite broadcasting signals outputted from the third band elimination filter 102*c* are also subjected to the frequency conversion in the third mixer 103*c* and are converted into the third intermediate frequency signal FIH2 of 1650 MHz to 2150 MHz.

The intermediate frequency amplifying circuit 104 includes first to fourth intermediate frequency amplifiers 104*a*, 104*b*, 104*c*, 104*d*. The intermediate frequency amplifying circuit 104 receives the first to the fourth intermediate frequency signals outputted from the frequency converter 103 as inputs and outputs these signals to the signal selecting means 105 after amplifying them to a given level. That is, the first intermediate frequency signal FIL1 is inputted to the first intermediate frequency amplifier 104*a* and the first intermediate frequency amplifier 104*a* transmits an output signal to the signal selecting means 105. The second intermediate frequency signal FIH1 is inputted to the second intermediate frequency amplifier 104*b* and the second intermediate frequency amplifier 104*b* transmits an output signal to the signal selecting means 105. The third intermediate frequency signal FIH2 is inputted to the third intermediate frequency amplifier 104*c* and the third intermediate frequency amplifier 104*c* transmits an output signal to the signal selecting means 105. The fourth intermediate frequency signal FIL2 is inputted to the fourth intermediate frequency amplifier 104*d* and the fourth intermediate frequency amplifier 104*d* transmits an output signal to the signal selecting means 105.

The signal selecting means 105 includes the first and second signal synthesizing circuits 110, 111 and a signal changeover control circuit 112. The first signal synthesizing circuit 110 synthesizes the inputted first and second intermediate frequency signals FIL1, FIH1 and transmits a synthesized signal to the signal changeover control circuit 112. In the same manner, the second signal synthesizing circuit 111 synthesizes the inputted third and fourth intermediate frequency signals FIH2, FIL1 and transmits a synthesized signal to the signal changeover control circuit 112. The signal changeover control circuit 112 selects one of the synthesized signal composed of the first intermediate frequency signal FIL1 and the second intermediate frequency signal FIH1 and the synthesized signal composed of the third intermediate frequency signal FIH2 and the fourth intermediate frequency signal FIL2, and outputs the selected synthesized signal to the first output terminal 105*a* and the second output terminal 105*b* respectively. This changeover control is explained later.

Then, to the first and second output ends 105*a*, 105*b*, satellite broadcasting receiving television sets (not shown in the drawing) which are independent from each other are connected. From the respective satellite broadcasting receiving television sets, voltages for operating respective circuits are supplied to the converter circuit together with control signals which controls the signal selecting means 105. For example, by superposing control signals of 22 kHz to a voltage of DC 15V, it is discriminated whether the synthesized signal composed of the intermediate frequency signals FIL1, FIH1 or the synthesized signal composed of the intermediate frequency signals FIL2, FIH2 is selected. That is, in selecting one of a case in which the satellite broadcasting receiving television set receives the rightward circularly polarized signal SR1 and the leftward circularly polarized signal SL1 from the first satellite S1 and a case in which the satellite broadcasting receiving television set receives the rightward circularly polarized signal SR2 and the leftward circularly polarized signal SL2 from the second satellite S2, the satellite broadcasting receiving television set supplies the control signals to be superposed on the supply voltage to the output terminals 105*a*, 105*b* respectively. These voltages are inputted to the signal changeover control circuit 112 from the first output terminal 105*a* through a choke coil 113 for impeding high frequency and, in the same manner, are inputted to the signal changeover control circuit 112 from the second output terminal 105*b* through a choke coil 114 for impeding high frequency.

On the other hand, the first voltage and the second voltage are respectively inputted to the first and second regulators 106, 107 through the choke coils 113, 114 for impeding high frequency and the first and second regulators 106, 107 supply the power supply voltage (for example, 8V) to respective circuits. Accordingly, the first and second regulators 106, 107 have the same constitution and a voltage stabilizing circuit is constituted of integrated circuits. Then, the first and second regulators 106, 107 have output ends thereof respectively connected to power supply voltage output ends 117 through diodes 115, 116 for preventing reverse flow. Accordingly, even when only either one of the satellite broadcasting television sets is operated, the power supply voltage is supplied to respective circuits. Further, the first and second output ends 105*a*, 105*b* are connected to the power supply voltage output terminals 117 through the respective regulators 106, 107. Accordingly, by making use of the inter-element isolation which the first and second regulators 106, 107 have, the converter circuit is configured such that the control signals supplied from the first output end 105*a* are prevented from being inputted to the signal changeover control circuit 112, for example. In the same manner, the converter circuit is configured such that the control signals supplied from the second output end 105*b* are prevented from being inputted to the signal changeover control circuit 112, for example.

As shown in FIG. 20, in the converter circuit having the above-mentioned constitution, the constitutional parts for RF circuits which are arranged in a stage preceding the frequency converter 103 are mounted on the first printed circuit board 6, the components for IF circuits which are arranged in a stage succeeding the intermediate frequency amplifying circuit 104 are mounted on the second printed circuit board 7, and the first printed circuit board 6 and the second printed circuit board 7 are partially overlapped to each other and, thereafter, are bonded and integrally formed.

In this case, the layout of signal lines is designed such that the signal lines for the rightward circularly polarized signals SR1, SR2 of the first satellite S1 and the second satellite S2 are arranged at the outermost side of the first printed circuit board 6 and the signal lines for the leftward circularly polarized signals SL1, SL2 of the first satellite S1 and the second satellite S2 are arranged at the inside of the signal lines for the rightward circularly polarized signals SR1, SR2 on the first printed circuit board 6. Here, the rightward circularly polarized signals SR1, SR2 arranged at the outside are subjected to frequency conversion by the first and fourth mixers 103*a*, 103*d* which are connected to the first oscillator 108 such that the rightward circularly polarized signals SR1, SR2 are converted into the first and fourth intermediate frequency signals FIL1, FIL2 of 950 MHz to 1450 MHz. Further, the leftward circularly polarized signals SL1, SL2 arranged at the inside are subjected to frequency conversion by the second and third mixers 103*b*, 103*c* which are connected to the second oscillator 109 such that the leftward circularly polarized signals SL1, SL2 are converted into the second and third intermediate frequency signals FIH1, FIH2 of 1650 MHz to 2150 MHz. That is, the first oscillator 108 and the second oscillator 109 are arranged at the center of the first printed circuit board 6, the first oscillator 108 is connected to the first mixer 103*a* and the fourth mixer 103*d* arranged at the outside through an oscillation signal line 36, and the second oscillator 109 is connected to the second mixer 103*b* and the third mixer 103*c* arranged at the inside through oscillation signal lines 37.

As shown in FIG. 21, the intermediate frequency signal lines 38 for the intermediate frequency signals FIL1, FIL2, FIH1, FIH2 outputted from respective mixers 103*a* to 103*d* on the first printed circuit board 6 are connected to the intermediate frequency amplifying circuit 104 on the second printed circuit board 7 through a connecting pin 39. In a portion where the first printed circuit board 6 and the second printed circuit board 7 are overlapped to each other, a ground pattern 24 formed on the first printed circuit board 6 and a ground pattern 25*a* for ed on the part mounting surface of the second printed circuit board 7 are brought into contact with each other. Further, a lead pattern 40 which faces the ground pa tern 25*a* in an opposed manner is formed on the second printed circuit board 7 and this lead pattern 40 is connected to the intermediate frequency amplifying circuit 104 of the second printed circuit board 7 via a through hole 41, and both ends of the connecting pin 39 are soldered to the intermediate frequency signal line 38 and the lead pattern 40. Accordingly, while holding the grounds on the printed circuit boards 6, 7, it is possible to allow the oscillation signal line 36 which connects the first oscillator 108 with the first and fourth mixers 103*a*, 103*d* arranged at the outside an the intermediate frequency signal line 38 which transmits the intermediate frequency signals FIL1 to FIL4 from the respective mixers 103a to 103d to the intermediate frequency amplifying circuit 104 to cross each other at the overlapped portion of the first printed circuit board 6 and the second printed circuit board 7.

In the satellite broadcasting receiving converter according to the above-mentioned embodiment, the constitutional elements for RF circuit which constitute a stage coming before the frequency converter 103 are mounted on the first printed circuit board 6, the first printed circuit board 6 and the second printed circuit board 7 are bonded and integrally formed by way of the ground patterns 24, 25*a*, and the constitutional elements for IF circuit which come after the intermediate frequency amplifying circuit 104 are mounted on the second printed circuit board 7 and hence, it is possible to make the oscillation signal line 36 and the intermediate frequency signal line 38 cross each other while holding the grounds on the first printed circuit board 6 and the second printed circuit board 7. Accordingly, compared to the related art which made the oscillation signal line and the intermediate frequency signal line cross each other by way of a coaxial cable, the manufacturing cost of the satellite broadcasting receiving antenna can be reduced as much as it is possible to eliminate the coaxial cable which requires the time-consuming cumbersome connection.

Further, at the overlapped portion of the first printed circuit board 6 and the second printed circuit board 7, the ground pattern 24 formed on the first printed circuit board 6 and the ground pattern 25*a* formed on the second printed circuit board 7 are brought into contact with each other and hence, it is possible to ensure the grounding with respect to respective signal lines 36, 38. Further, since the intermediate frequency signal line 38 on the first printed circuit board 6 and the lead pattern 40 formed on the second printed circuit board 7 are connected by way of the connecting pin 39, it is possible to make the oscillation signal line 36 and the intermediate frequency signal line 38 cross each other by the simple soldering operation. Further, since the second printed circuit board 7 on which components for IF circuit are mounted is formed of a material which has a Q value lower than that of the first printed circuit board 6 on which components for RF circuit are mounted and the second printed circuit board 7 is formed of an inexpensive material such as epoxy resin containing glass, the total cost of the required printed circuit boards can be reduced compared to a case in which all circuit components are mounted on an expensive printed circuit board formed of polytetrafluoroethylene.

Further, according to the satellite broadcasting receiving converter according to the above-mentioned embodiment, the first and second waveguides 1, 2 having respective axes thereof arranged parallel to each other are accommodated in the waterproof cover 9 and the projection wall 34 or the thick wall 35 is formed as the correction part on the front surface 9*a* of the waterproof cover 9 which face the radiation parts 10, 14 of the dielectric feeders 3, 4 held by both waveguides 1, 2. Accordingly, when the radio waves transmitted from the neighboring first and second satellites S1, S2 are converged by the reflector and enter the inside of respective waveguides 1, 2, it is possible to delay the phase of the radio waves which pass the waterproof cover 9 by means of the correction part (projection wall 34 or thick wall 35). Therefore, it is possible to adjust the converter such that radiation patterns of the radio waves incident on respective waveguides 1, 2 can be reflected on the common portion of the reflector whereby it is possible to miniaturize the required reflector.

Further, waveguides which have the same structure as a single waveguide which is used for one satellite broadcasting receiving converter can be directly used as the first and second waveguides 1, 2 and hence, an expensive mold for die casting can be omitted so that the manufacturing cost can be reduced. Further, it is sufficient to change the waterproof cover 9 corresponding to the degree of elongation of the satellites which are subjected to reception of signals and hence, it is possible to realize the satellite broadcasting receiving converter which can provide versatility.

Here, in the above-mentioned embodiment, although the waveguide structure has been explained in which the dielectric feeders 3, 4 are held by the first and second waveguides 1, 2 and the radio waves which pass the waterproof cover 9 enter the radiation parts 10, 14 of the dielectric feeders 3, 4, the waveguide structure is applicable to the waveguides which have horns at one ends thereof.

The present invention is put into practice in the molds explained above and can obtain the following advantageous effects.

In a satellite broadcasting receiving converter which receives radio signals transmitted from a plurality of neighboring satellites, performs frequency conversion of two polarized signals transmitted from one satellite into different intermediate frequency bands using first and second mixers, and connects each first mixer and each second mixer to either one of two local oscillation circuits which differ in oscillation frequency from each other, the local oscillation circuit and each mixer are connected to each other using an oscillation signal line on one surface of a first printed circuit board, the other surface of the first printed circuit board and one surface of a second printed circuit board are bonded by way of a ground pattern, an intermediate frequency signal line for an intermediate frequency signal outputted from each mixer is pulled out from one surface of the first printed circuit board to the other surface of the second printed circuit board at bonded portions, and the intermediate frequency signal line and the oscillation signal line are made to cross each other. Accordingly, the oscillation signal line and the intermediate frequency signal line can be made to cross each other while holding the grounds without using the coaxial cable which necessitates time-consuming and cumbersome operation in connection so that the manufacturing cost of the satellite broadcasting receiving converter can be reduced.

Further, a plurality of waveguides which have respective axes thereof arranged in parallel to each other are covered with the waterproof cover and the correction part which delays the phase of radio waves incident on respective waveguides is mounted on the waterproof cover. Accordingly, by delaying the phase of the radio waves which pass the waterproof cover when the radio waves transmitted from a plurality of neighboring satellites enter the openings of respective waveguides after being reflected on the reflector at the correction part, it is possible to adjust the converter such that the radiation patterns of the radio waves incident on respective waveguides can be reflected on a common portion of the reflector so that it is possible to miniaturize the required reflector. Further, waveguides which have the same structure as that of a single waveguide which is used for one satellite can be used so that the manufacturing cost can be reduced. Still furthermore, since it is sufficient to change the waterproof cover corresponding to the degree of elongation of the satellites which are subject to reception of signals, it is possible to realize the satellite broadcasting receiving converter which provide versatility.

What is claimed is:

1. A satellite broadcasting receiving converter which receives radio waves transmitted from a plurality of neighboring satellites, performs frequency conversion of two polarized signals transmitted from one satellite into different intermediate frequency bands using first and second mixers, and connects each first mixer and each second mixer to either one of two local oscillation circuits which differ in oscillation frequency from each other, wherein each local oscillation circuit and the respective mixers are connected to each other using an oscillation signal line on a first surface of a first printed circuit board, wherein a second surface of the first printed circuit board and a first surface of a second printed circuit board are bonded by way of a ground pattern, wherein an intermediate frequency signal line for an intermediate frequency signal outputted from each of the mixers is pulled out from one surface of the first printed circuit board to a second surface of the second printed circuit board at bonded portions, and wherein the intermediate frequency signal line and the oscillation signal line are made to cross each other.

2. A satellite broadcasting receiving converter according to claim 1, wherein the ground pattern is formed on each of the first printed circuit board and the second printed circuit board.

3. A satellite broadcasting receiving converter according to claim 1, wherein the intermediate frequency signal line is connected between the first surface of the first printed circuit board to the second surface of the second printed circuit board via a connecting pin.

4. A satellite broadcasting receiving converter according to claim 1, wherein the second printed circuit board is formed of a material having Q value lower than a Q value of a material of the first printed circuit board.

* * * * *